United States Patent
Nishikawa et al.

(10) Patent No.: US 10,197,464 B2
(45) Date of Patent: Feb. 5, 2019

(54) SEMICONDUCTOR PHYSICAL QUANTITY SENSOR HAVING FILTER CIRCUITS FOR BLOCKING ELECTROMAGNETIC WAVE NOISE

(71) Applicant: FUJI ELECTRIC CO., LTD., Kawasaki-shi, Kanagawa (JP)

(72) Inventors: Mutsuo Nishikawa, Matsumoto (JP); Katsuya Karasawa, Shiojiri (JP); Kazuhiro Matsunami, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/198,530

(22) Filed: Jun. 30, 2016

(65) Prior Publication Data
US 2017/0045407 A1 Feb. 16, 2017

(30) Foreign Application Priority Data

Aug. 11, 2015 (JP) .................................. 2015-159265

(51) Int. Cl.
G01L 9/06 (2006.01)
G01D 3/032 (2006.01)
G01L 9/00 (2006.01)

(52) U.S. Cl.
CPC .............. *G01L 9/06* (2013.01); *G01L 9/0054* (2013.01)

(58) Field of Classification Search
None
See application file for complete search history.

(56) References Cited

U.S. PATENT DOCUMENTS

| 8,988,063 | B2* | 3/2015 | Mazzarella | G01R 19/0092 324/117 R |
| 2003/0080760 | A1* | 5/2003 | Takeuchi | G01L 9/06 324/713 |
| 2004/0189480 | A1* | 9/2004 | Imai | B60T 17/22 340/663 |
| 2006/0125567 | A1 | 6/2006 | Mizue | |
| 2006/0244101 | A1 | 11/2006 | Uematsu et al. | |
| 2009/0167280 | A1* | 7/2009 | Wei | G05F 3/16 323/313 |

FOREIGN PATENT DOCUMENTS

| JP | 2003-139638 A | 5/2003 |
| JP | 2004-222015 A | 8/2004 |
| JP | 2006-162421 A | 6/2006 |
| JP | 2006-310658 A | 11/2006 |

* cited by examiner

*Primary Examiner* — Harshad R Patel
*Assistant Examiner* — Brandi N Hopkins
(74) *Attorney, Agent, or Firm* — Rabin & Berdo, P.C.

(57) ABSTRACT

A semiconductor physical quantity sensor device having a power source terminal for receiving a power source potential, a ground terminal for receiving a ground potential, and an output terminal. The semiconductor physical quantity sensor includes a sensor configured to generate a signal, an amplifier configured to amplify the signal, and to output the amplified signal through the output terminal, a first resistor electrically connected between the power source terminal and the amplifier, a second resistor electrically connected between the output terminal and the ground terminal, and a filter electrically connected between the power source terminal and the sensor, and including a third resistor and a capacitor.

14 Claims, 14 Drawing Sheets

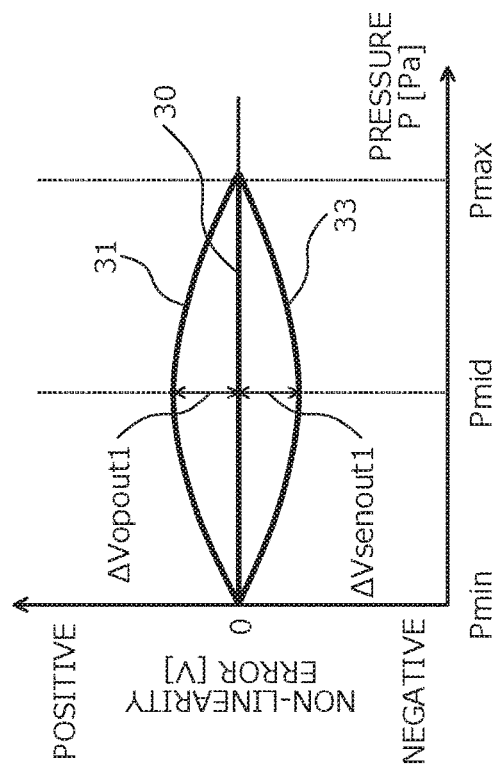
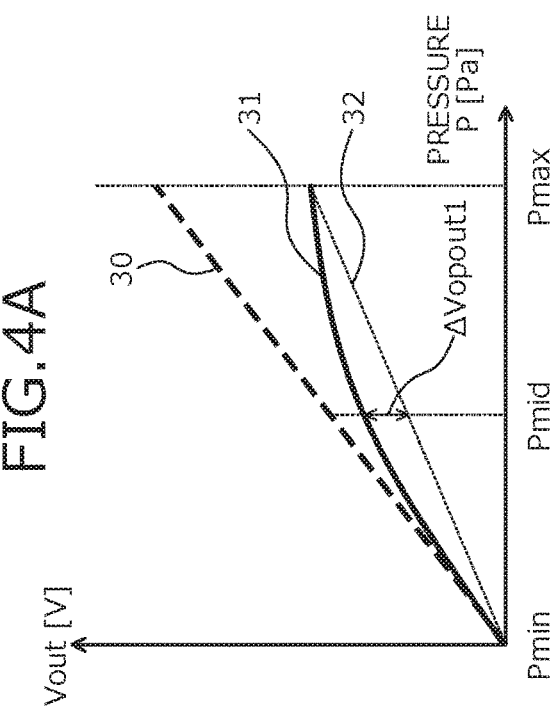
FIG.4A
FIG.4B

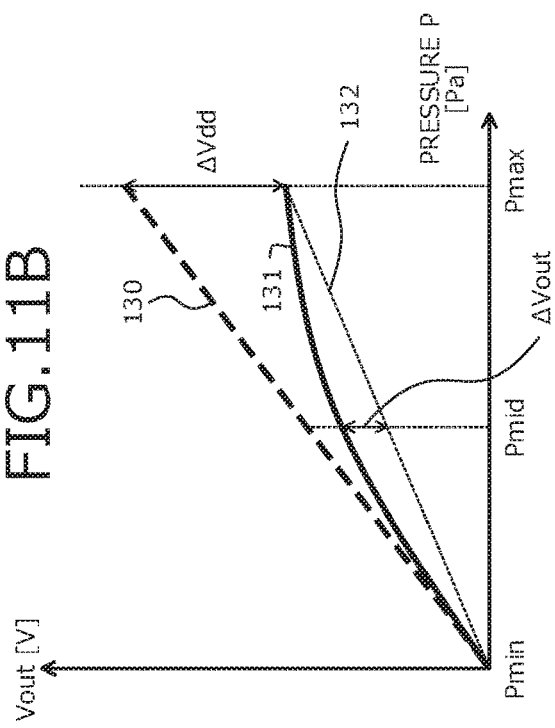
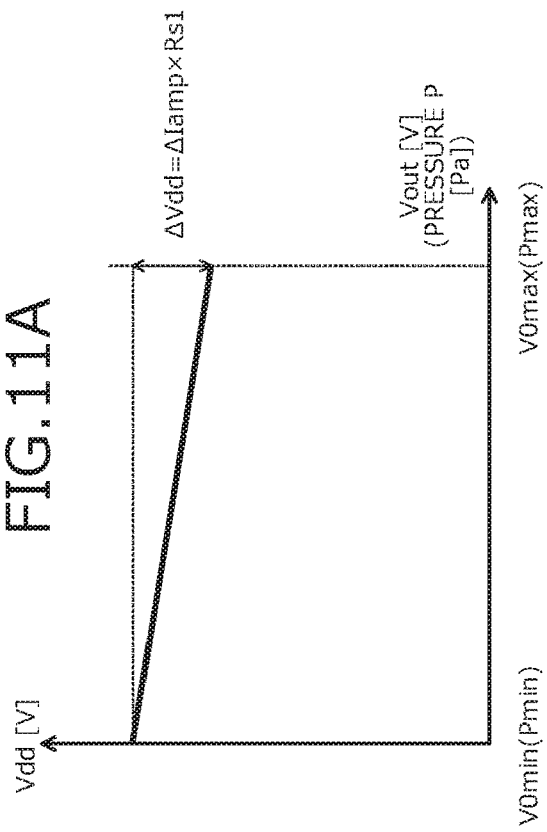
FIG.11A
FIG.11B

WHEN FRONT-SURFACE PRESSURE SENSOR IS USED

WHEN BACK-SURFACE PRESSURE SENSOR IS USED

SEMICONDUCTOR PHYSICAL QUANTITY SENSOR HAVING FILTER CIRCUITS FOR BLOCKING ELECTROMAGNETIC WAVE NOISE

CROSS REFERENCE TO RELATED APPLICATIONS

This application is based upon and claims the benefit of priority of the prior Japanese Patent Application No. 2015-159265, filed on Aug. 11, 2015, the entire contents of which are incorporated herein by reference.

BACKGROUND OF THE INVENTION

1. Field of the Invention

Embodiments of the present invention relate to a semiconductor physical quantity sensor device.

2. Description of the Related Art

Filter circuits for blocking exogenous electromagnetic wave noise are mounted inside integrated circuit (IC) chips as a measure against electromagnetic wave noise in semiconductor physical quantity sensor device such as a pressure sensor apparatus. For example, in an IC chip used in automobiles, etc., a capacitor-resistor (CR) filter made up of a capacitor and a resistor (hereinafter, filter resistor) has a single-stage configuration or a multistage configuration like a quadratic filter and is connected to power source wiring or sensor output wiring of the integrated circuit.

A configuration of a conventional semiconductor physical quantity sensor device will be described by taking, as an example, a case in which a CR filter is connected to power source wiring in a single-stage configuration. FIG. 14 is a circuit diagram of an example of a conventional semiconductor physical quantity sensor device. The conventional semiconductor physical quantity sensor device depicted in FIG. 14 includes internal circuits such as a sensor unit 101, an operational amplifier 102, a characteristic correction circuit 103, and a reference voltage circuit 104 connected in parallel between a power source terminal (power source pad) 111 and a ground terminal (grounding pad) 113. Source voltage Vcc is applied to the power source terminal 111 from an external source. Ground voltage GND is applied to the ground terminal 113. An output terminal 112 outputs to an external destination, output voltage Vout from the operational amplifier 102.

A CR filter 105 made up of a capacitor 106 and a filter resistor 107 is connected in a single-stage configuration to power source wiring S1 connecting the internal circuits and the power source terminal 111. The filter resistor 107 is connected to the power source wiring S1. The capacitor 106 has a positive electrode connected between the filter resistor 107 and the operational amplifier 102 and a negative electrode connected between the operational amplifier 102 and the ground terminal 113. Reference character C1 denotes the capacitance of the capacitor 106. The CR filter 105 acts as a low-pass filter removing radio noise input to the power source terminal 111 and suppresses variations in potential in the power source wiring S1 due to electromagnetic noise.

Among semiconductor physical quantity sensor devices having a CR filter as described above, a device has been proposed in which the lengths and widths of wiring are selected to satisfy a relational equation [R1/Rf×100<25], where Rf is a resistance value of the resistor making up the CR filter of the wiring connecting the internal circuits and the power source pad, and R1 is a parasitic resistance component of the wiring from the power source pad to the internal circuits (for example, refer to Japanese Laid-Open Patent Publication No. 2006-310658). In Japanese Laid-Open Patent Publication No. 2006-310658, the parasitic resistance component R1 is set to 25% or less relative to the resistance value Rf of the resistor making up the CR filter so as to improve the performance of the CR filter.

Another semiconductor physical quantity sensor device having a CR filter has been proposed that has separate ground wiring of differing configurations respectively for circuit reference voltage and for a noise filter. The ground wiring is connected via a grounding pad to a bonding wire to form a single-point ground (for example, refer to Japanese Laid-Open Patent Publication No. 2006-162421). In Japanese Laid-Open Patent Publication No. 2006-162421, voltage variations are prevented in the ground wiring for the circuit reference voltage when high-frequency noise is applied/injected to a sensor chip (IC chip), so as to improve noise immunity.

Performance qualities important for semiconductor physical quantity sensor devices include a wide sensor-chip output voltage range in addition to the high noise immunity described above. For example, rail-to-rail output that enables the sensor-chip output voltage range defined substantially from a lower limit value (ground voltage GND) to an upper limit value (source voltage Vcc) is ideal. Various push-pull output type operational amplifiers have been proposed as rail-to-rail output operational amplifiers (for example, refer to Japanese Laid-Open Patent Publication No. 2004-222015).

Additionally, important indexes representative of the performance of semiconductor physical quantity sensor devices include non-linearity. Non-linearity is an index indicative of whether an amplitude Y of a converted/output signal is linear (first-order) with respect to an amplitude X of a physical quantity applied to the sensor chip. This means quantifying the extent of divergence of actual output voltage Vout having a curve of the second order, from an ideal linear equation $Y=aX+b$ (a and b are constants) of the output characteristics of the sensor chip. The ideal value of the output characteristics of the sensor chip represents a state in which non-linearity error is zero, i.e., a state without divergence from the ideal linear equation.

For a semiconductor physical quantity sensor device configured to adjust the non-linearity of the output characteristics of the sensor chip, an apparatus has been proposed that includes a voltage amplifying unit that amplifies and outputs the output from a sensor element unit for pressure, and an output voltage feedback unit that feeds back the output voltage of the voltage amplifying unit as a reference power source voltage so as to give non-linear characteristics to the output voltage of the voltage amplifying unit with respect to pressure (for example, refer to Japanese Laid-Open Patent Publication No. 2003-139638).

SUMMARY OF THE INVENTION

According to one aspect of the present invention, a semiconductor physical quantity sensor device includes a sensor element generating an electrical signal corresponding to a sensed physical quantity; a push-pull amplifier circuit amplifying the electrical signal generated by the sensor element; a power source terminal supplying a power source potential; a ground terminal supplying a ground potential; and an output terminal outputting to an external destination, the electrical signal amplified by the amplifier circuit. The semiconductor physical quantity sensor device further includes a first power source wiring connected between the power source terminal and the sensor element; a second power source wiring connected between the power source terminal and the amplifier circuit; and a ground wiring connected between the ground terminal and low potential sides of the sensor element and the amplifier circuit. The semiconductor physical quantity sensor device further includes an electromagnetic-noise filter circuit connected to the first power source wiring and including a resistance unit and a capacitance unit; a first resistor connected to the second power source wiring; and a second resistor connected between the output terminal and the ground terminal.

The semiconductor physical quantity sensor device further includes a first ground wiring connected between the ground terminal and the sensor element; a second ground wiring connected between the ground terminal and the amplifier circuit; a third resistor connected to the second ground wiring; and a fourth resistor connected between the power source terminal and the output terminal.

In the semiconductor physical quantity sensor device, the first resistor includes plural first resistor elements connected in series. The third resistor includes plural second resistor elements connected in series. The semiconductor physical quantity sensor device further includes a first switch connected to the plurality of the first resistor elements, the first switch being connected to both ends of and in parallel with each first resistor element among the plurality of the first resistor elements; a second switch connected to the plurality of the second resistor elements, the second switch being connected to both ends of and in parallel with each second resistor element among the plurality of the second resistor elements; and a control circuit controlling ON/OFF of the first switch and the second switch.

The semiconductor physical quantity sensor device further includes a fifth resistor connected between the power source terminal and the ground terminal.

According to another aspect of the present invention, a semiconductor physical quantity sensor device includes a sensor element generating an electrical signal corresponding to a sensed physical quantity; a push-pull amplifier circuit amplifying the electrical signal generated by the sensor element; a power source terminal supplying a power source potential; a ground terminal supplying a ground potential; and an output terminal outputting to an external destination, the electrical signal amplified by the push-pull amplifier circuit. The semiconductor physical quantity sensor device further includes a first ground wiring connected between the ground terminal and the sensor element; a second ground wiring connected between the ground terminal and the push-pull amplifier circuit; a power source wiring connected between the power source terminal and high potential sides of the sensor element and the amplifier circuit; an electromagnetic-noise filter circuit connected to the power source wiring and including a resistance unit and a capacitance unit; a first resistor connected to the second ground wiring; and a second resistor connected between the power source terminal and the output terminal.

In the semiconductor physical quantity sensor device, the first resistor has a resistance value set such that output characteristics of the electrical signal amplified by the amplifier circuit have non-linearity of reverse characteristics so as to cancel non-linearity of output characteristics of the electrical signal generated by the sensor element.

In the semiconductor physical quantity sensor device, the first resistor has a resistance value set such that a first equation expressing output characteristics of the electrical signal generated by the sensor element and a second equation expressing output characteristics of the electrical signal amplified by the amplifier circuit become linearly symmetric with respect to an axis defined by a linear equation expressing output characteristics without non-linearity of the electrical signal output from the output terminal.

In the semiconductor physical quantity sensor device, the sensor element is disposed on a front surface side of a sensor chip, and a pressure is applied as the physical quantity to the sensor chip, from a front surface side.

In the semiconductor physical quantity sensor device, the sensor element is disposed on a back surface side of a sensor chip, and a pressure is applied as the physical quantity to the sensor chip from the back surface side on an opposite side of the sensor chip with respect to a front surface side of the sensor chip.

Objects, features, and advantages of the present invention are specifically set forth in or will become apparent from the following detailed description of the invention when read in conjunction with the accompanying drawings.

BRIEF DESCRIPTION OF THE DRAWINGS

FIGS. 4A and 4B are characteristic diagrams of the operation of the semiconductor physical quantity sensor device according to the first embodiment;

FIGS. 10, 11A, and 11B are explanatory diagrams of a mechanism of generation of non-linearity in a conventional semiconductor physical quantity sensor device;

DETAILED DESCRIPTION OF THE INVENTION

Figure 1:
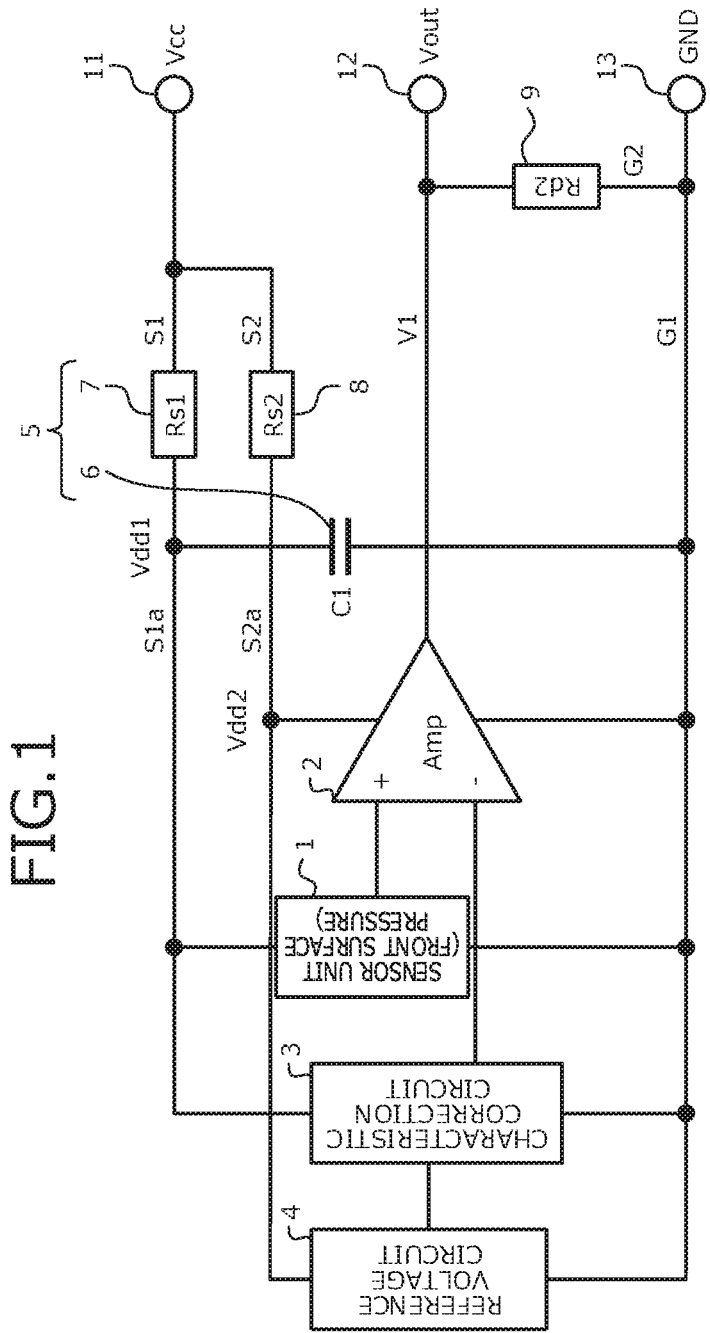
FIG. 1 is a circuit diagram of a configuration of a semiconductor physical quantity sensor device according to a first embodiment.

Embodiments of a semiconductor physical quantity sensor device according to the present invention will be described with reference to the accompanying drawings. In the following description of the embodiments and the accompanying drawings, the identical constituent elements are denoted by the same reference numerals and are not repeatedly described.

Figure 2B:
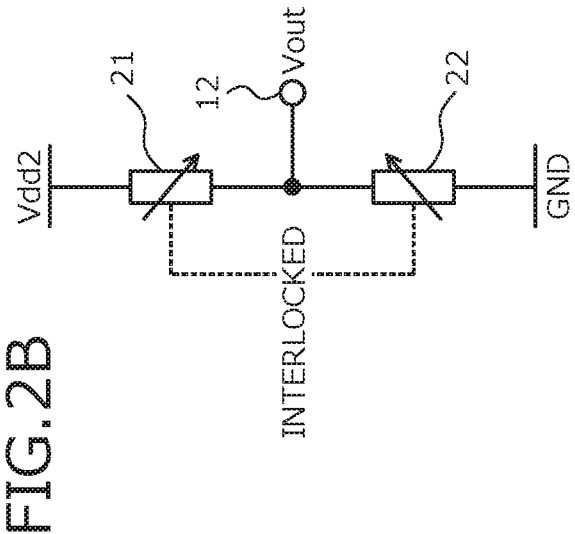
FIGS. 2A and 2B are circuit diagrams of a configuration of an amplifier circuit in FIG. 1.
Figure 2A:
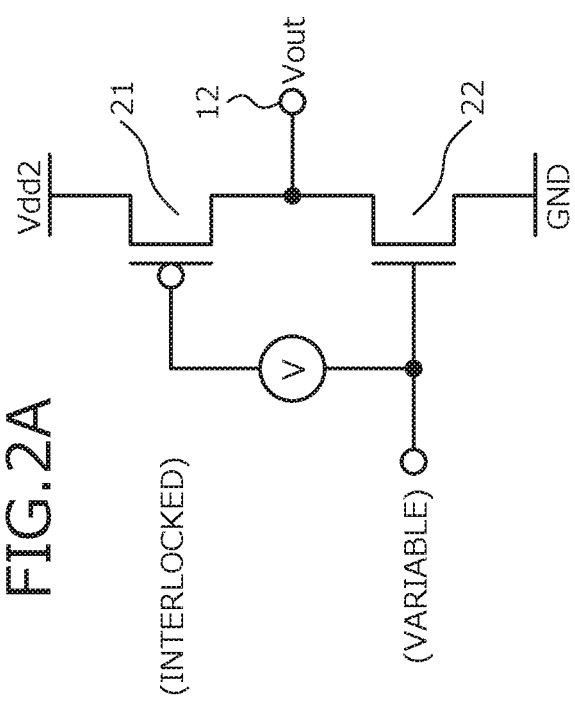

Configuration of a semiconductor physical quantity sensor device according to a first embodiment will be described. FIG. 1 is a circuit diagram of a configuration of the semiconductor physical quantity sensor device according to the first embodiment. FIGS. 2A and 2B are circuit diagrams of a configuration of an amplifier circuit in FIG. 1. The semiconductor physical quantity sensor device according to the first embodiment depicted in FIG. 1 includes internal circuits such as a sensor unit 1, an amplifier circuit 2, a characteristic correction circuit 3, a reference voltage circuit 4, a CR filter 5, and resistors (hereinafter, first and second resistors) 8, 9, as well as three terminals 11 to 13. These internal circuits are made up of active elements and passive elements on a single semiconductor chip (sensor chip, not depicted) and manufactured by a complementary metal oxide semiconductor (CMOS) manufacturing process, for example.

For example, the sensor unit 1 is a sensor element that generates an electrical signal (voltage signal) corresponding to a sensed physical quantity. The physical quantity is, for example, a physical quantity other than temperature and temperature dependent such as pressure, acceleration, gyro (angle and angular velocity), and a flow rate. For example, if the physical quantity sensed by the sensor unit 1 is pressure, the sensor chip may be a pressure sensor chip 140 depicted in FIG. 12B. The sensor chip has a diaphragm 141 that is a pressure receiving unit formed by a recess-forming process from a back surface of a semiconductor substrate (silicon substrate), and has internal circuits such as the sensor unit 1 fabricated on the front surface side. For the sensor unit 1, a Wheatstone bridge is disposed that is made up of four piezoresistive elements (sensor elements) that convert the pressure received by the diaphragm 141 into strain. Two semiconductor strain gauges 142 represent two piezoresistive elements and are made up of diffusion regions formed by ion implantation of impurities from the front surface and heat treatment. Internal circuits other than the sensor unit 1 may be formed in a surface layer in a thick semiconductor substrate region other than the diaphragm 141. Alternatively, internal circuits other than the sensor unit 1 may be formed on a semiconductor substrate (not depicted) different from the sensor chip 140. The sensor chip of this embodiment includes a typical configuration of a front-surface pressurization type to which pressure is applied from the front surface side.

The amplifier circuit 2 is a push-pull output type operational amplifier amplifying a signal output from the sensor unit 1. For example, the amplifier circuit 2 has a non-inverting (+) input terminal connected to the sensor unit 1 and an inverting (−) input terminal connected to the characteristic correction circuit 3. The amplifier circuit 2 amplifies a difference between voltage signals input to the non-inverting input terminal and the inverting input terminal from the sensor unit 1 and the characteristic correction circuit 3, respectively, and outputs the difference as output voltage Vout. The output voltage Vout of the amplifier circuit 2 is output as output of the sensor chip via output wiring V1 from the output terminal (output pad) 12 to an external destination.

A push-pull output circuit unit in the amplifier circuit 2 is formed by connecting drains of a p-channel type first metal-oxide-semiconductor field-effect transistor (MOSFET) 21 and an n-channel type second MOSFET 22 to each other (FIG. 2A). A gate potential of the second MOSFET 22 is controlled in conjunction with a gate potential of the first MOSFET 21. The output voltage Vout of the amplifier circuit 2 is controlled by operating the first and second MOSFETs 21, 22 such that a resistance value of the second MOSFET 22 becomes higher (lower) as a resistance value of the first MOSFET 21 becomes lower (higher). The first and second MOSFETs 21, 22 may be represented as variable resistors in terms of an equivalent circuit (FIG. 2B). The output voltage Vout is controlled by changing the respective resistance values in an interlocked manner as described above and this interlocked operation is performed in reversed phases and is, therefore, referred to as the push-pull output type.

The characteristic correction circuit 3 adjusts the sensitivity of the sensor unit 1 with consideration of temperature characteristics and makes offset adjustment with consideration of temperature characteristics for the amplifier circuit 2. The reference voltage circuit 4 generates from an internal high-potential voltage Vdd2 supplied from a second power source wiring S2a described later, reference voltage suitable for driving the characteristic correction circuit 3 and supplies the reference voltage to the characteristic correction circuit 3. External source voltage Vcc is applied to the power source terminal (power source pad) 11. External ground voltage GND is applied to the ground terminal (grounding pad) 13. The sensor unit 1, the amplifier circuit 2, the characteristic correction circuit 3, and the reference voltage circuit 4 are connected in parallel between the power source terminal 11 and the ground terminal 13.

For example, two power source wirings (hereinafter, first and second power source wirings S1a, S2a) are electrically connected to the power source terminal 11 in parallel. The first power source wiring S1a is connected to the high potential sides of the sensor unit 1 and the characteristic correction circuit 3, and the second power source wiring S2a is connected to the high potential sides of the amplifier circuit 2 and the reference voltage circuit 4. The low potential sides of the sensor unit 1, the amplifier circuit 2, the characteristic correction circuit 3, and the reference voltage circuit 4 are connected via ground wiring (hereinafter, first ground wiring) G1 to the ground terminal 13.

The first power source wiring S1a is connected through third power source wiring S1 to the power source terminal 11. The first power source wiring S1a supplies the sensor unit 1 and the characteristic correction circuit 3 with internal high-potential voltage Vdd1. The first power source wiring S1a is supplied with the source voltage Vcc from the power source terminal 11 via the third power source wiring S1 and a filter resistor 7 described later connected to the third power source wiring S1. An apparent potential difference (the internal high-potential voltage Vdd1) between the first power source wiring S1a and the ground wiring G1 increases with a decrease in voltage drop at the filter resistor 7.

The second power source wiring S2a is connected through fourth power source wiring S2 to the power source terminal 11. The second power source wiring S2a supplies the amplifier circuit 2 and the reference voltage circuit 4 with the internal high-potential voltage Vdd2. The second power source wiring S2a is supplied with the source voltage Vcc from the power source terminal 11 via the fourth power source wiring S2 and a first resistor 8 connected to the fourth power source wiring S2. An apparent potential difference (the internal high-potential voltage Vdd2) between the second power source wiring S2a and the ground wiring G1 decreases with an increase in voltage drop at the first resistor 8.

The CR filter 5 made up of a capacitor 6 and the resistor (filter resistor) 7 is connected to the third power source wiring S1, in a single-stage configuration, for example. The filter resistor 7 is connected to the third power source wiring S1. The capacitor 6 has a positive electrode connected between the filter resistor 7 and the sensor unit 1 and a negative electrode connected between the amplifier circuit 2 and the ground terminal 13. Reference numeral C1 denotes the capacitance of the capacitor 6. The CR filter 5 acts as a low-pass filter removing radio noise input to the power source terminal 11 and suppresses potential variations in the first power source wiring S1a due electromagnetic noise.

The first resistor 8 is connected to the fourth power source wiring S2. The first resistor 8 has a function of decreasing an apparent potential difference between the second power source wiring S2a and the ground wiring G1 by a voltage drop and causing the output characteristics of the amplifier circuit 2 to generate non-linearity having a convex-shaped curve in the positive direction (a positive error) with a predetermined no-linearity error ΔVopout1 (see FIGS. 4A and 4B described later). The no-linearity error ΔVopout1 of the output characteristics of the amplifier circuit 2 is adjusted by a resistance value Rs2 of the first resistor 8. The resistance value Rs2 of the first resistor 8 may be adjusted by connecting multiple first resistors 8 in series to the fourth power source wiring S2.

The third and fourth power source wirings S1, S2 may be configured such that the fourth power source wiring S2 is connected to a connection point on the third power source wiring S1 or such that the third power source wiring S1 is connected to a connection point on the fourth power source wiring S2. Alternatively, both the third and fourth power source wiring S1, S2 may be connected at one point of the power source terminal 11 to achieve so-called single-point power source wiring so that common impedance is eliminated. FIG. 1 depicts a configuration in which the fourth power source wiring S2 is connected to a connection point on the third power source wiring S1.

The second resistor 9 is connected to ground wiring (hereinafter, second ground wiring) G2 connected between the output terminal 12 and the ground terminal 13. The second resistor 9 is a feedback resistor having a function of increasing consumption current I1 of the amplifier circuit 2 according to an increase in the output voltage Vout of the amplifier circuit 2. The amount of increase of the consumption current I1 of the amplifier circuit 2 relative to the output voltage Vout of the amplifier circuit 2 is adjusted by a resistance value Rd2 of the second resistor 9. The non-linearity of the output characteristics of the amplifier circuit 2 may also be adjusted by the resistance value Rd2 of the second resistor 9.

Although the resistance value Rd2 of the second resistor 9 may be adjusted by connecting multiple second resistors 9 in series to the second ground wiring G2, the one second resistor 9 may be connected to the second ground wiring G2. This is because the resistor may be made to act as a pull-up resistor for detecting disconnection failure when power source wiring to an external circuit sharing the three terminals 11 to 13 fails as described later. Therefore, the one second resistor 9 may be connected to the second ground wiring G2 so that the non-linearity of the output characteristics of the amplifier circuit 2 is adjusted by the resistance value Rs2 of the first resistor 8.

Figure 3:
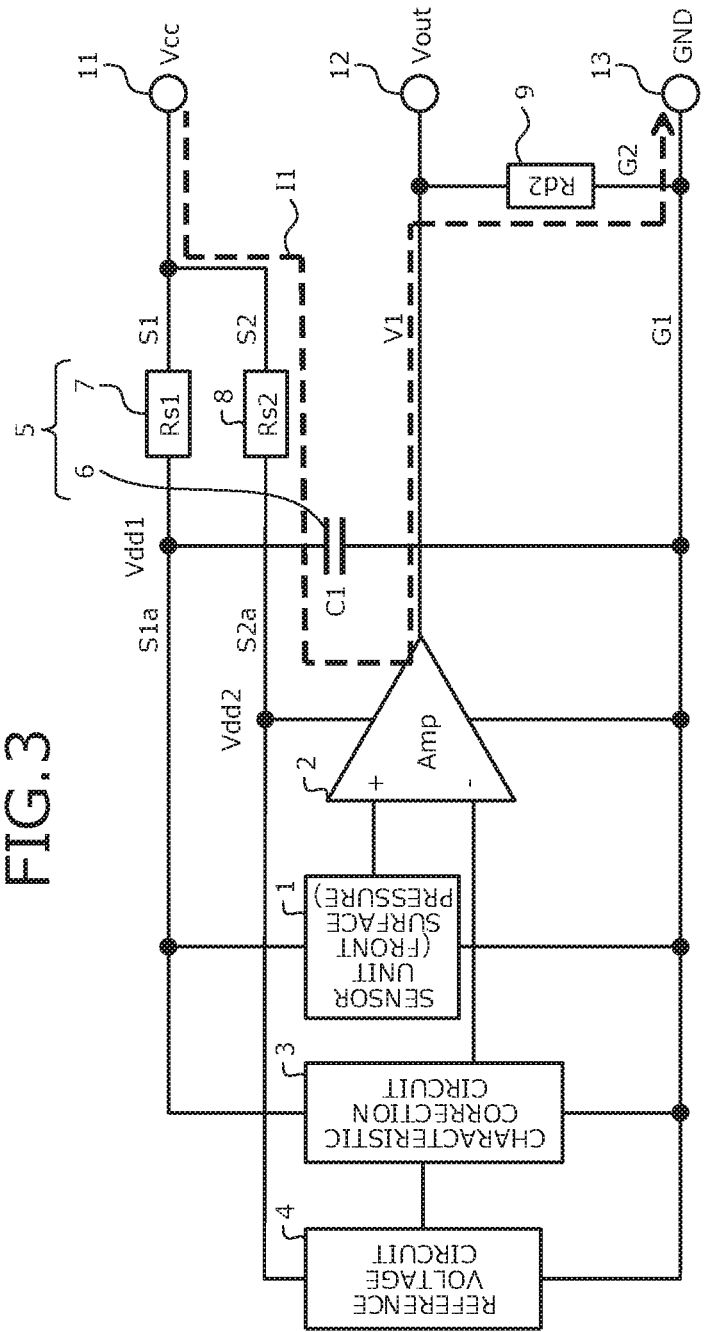
FIG. 3 is an explanatory diagram of operation of the semiconductor physical quantity sensor device according to the first embodiment.

Operation of the semiconductor physical quantity sensor device according to the first embodiment will be described. FIG. 3 is an explanatory diagram of the operation of the semiconductor physical quantity sensor device according to the first embodiment. FIGS. 4A and 4B are characteristic diagrams of the operation of the semiconductor physical quantity sensor device according to the first embodiment. In FIG. 3, the flow of the current I1 is indicated by a dashed lined arrow. As described above, since the amplifier circuit 2 is of the push-pull output type and the second resistor 9 is connected between an output terminal of the amplifier circuit 2 and the ground terminal 13, the consumption current I1 of the amplifier circuit 2 increases with an increase in the output voltage Vout of the amplifier circuit 2. As depicted in FIG. 3, current flows from the output terminal of the amplifier circuit 2 via the second resistor 9 to the ground terminal 13 and the current I1 (=Vout/Rd2) is thereby extracted from the power source terminal 11 according to the resistance value Rd2 of the second resistor 9. Therefore, the amount of change ΔI1 (increase) in the consumption current I1 of the amplifier circuit 2 is determined by the resistance value Rd2 of the second resistor 9.

As the consumption current I1 of the amplifier circuit 2 increases, the voltage drop at the first resistor 8 increases. As a result, the apparent potential difference (the internal high-potential voltage Vdd2) between the second power source wiring S2a and the ground wiring G1 decreases by the amount of voltage drop at the first resistor 8. To set the amount of decrease of the apparent potential difference between the second power source wiring S2a and the ground wiring G1, the dependency on the apparent potential difference between the second power source wiring S2a and the ground wiring G1 is known in advance in terms of the non-linearity of the output characteristics of the amplifier circuit 2. The resistance value Rs2 of the first resistor 8 may be set such that the output characteristics of the amplifier circuit 2 have the non-linearity of reverse characteristics so as to cancel the non-linearity of the output characteristics of the sensor unit 1. In particular, the resistance value Rs2 of the first resistor 8 may be set such that the absolute value of the non-linearity error of the actual output characteristics of the sensor unit 1 becomes substantially the same as the absolute value of the non-linearity error of the actual output characteristics of the amplifier circuit 2.

As the apparent potential difference between the second power source wiring S2a and the ground wiring G1 decreases, the internal high-potential voltage Vdd2 supplied to the reference voltage circuit 4 and the amplifier circuit 2 decreases. As the internal high-potential voltage Vdd2 supplied to the reference voltage circuit 4 decreases, the voltage supplied from the characteristic correction circuit 3 to the inverting input terminal of the amplifier circuit 2 decreases. Therefore, a correction amount for the amplifier circuit 2 supplied from the characteristic correction circuit 3 to the amplifier circuit 2 decreases by the amount ΔVdd2 (=ΔI1× Rs2) of decrease in the internal high-potential voltage Vdd2 due to the voltage drop in the first resistor 8.

As described above, both the voltage supplied from the characteristic correction circuit 3 to the inverting input terminal of the amplifier circuit 2 and the internal high-potential voltage Vdd2 supplied to the power supply terminal of the amplifier circuit 2 decrease based on the resistance values Rs2, Rd2 of the first and second resistors 8, 9. As a result, actual output characteristics 31 of the amplifier circuit 2 exhibit the non-linearity having a convex-shaped curve in the positive direction with a predetermined non-linearity error ΔVopout1.

Additionally, because of the decrease in the internal high-potential voltage Vdd2 supplied to the amplifier circuit 2, the slope of linear output characteristics 32 of the amplifier circuit 2 becomes smaller than a slope of ideal output characteristics 30 of the sensor chip. The linear output characteristics 32 of the amplifier circuit 2 represent a state where non-linearity of the actual output characteristics 31 of the amplifier circuit 2 (the non-linearity error $\Delta$Vopout1=0) is not exhibited. The ideal output characteristics 30 of the sensor chip represent a state without a divergence from the ideal linear equation of the output characteristics of the sensor chip. In particular, by adjusting the resistance values Rs2, Rd2 of the first and second resistors 8, 9, the non-linearity error $\Delta$Vopout1 of the actual output characteristics 31 of the amplifier circuit 2 is deliberately generated as a positive error (FIG. 4A). The non-linearity error $\Delta$Vopout1 of the actual output characteristics 31 of the amplifier circuit 2 is maximal at an intermediate pressure Pmid between a lower limit value Pmin and an upper limit value Pmax of a physical quantity (depicted as pressure in FIGS. 4A and 4B) detectable by the sensor unit 1.

On the other hand, based on the operation principle of the front-surface pressure sensor chip, actual output characteristics 33 of the sensor unit 1 exhibit non-linearity having a convex-shaped curve in the negative direction (i.e., a concave-shaped curve in the positive direction) with a non-linearity error $\Delta$Vsenout1. Additionally, because of an increment $\Delta$Vdd1 of the internal high-potential voltage Vdd1 supplied to the sensor unit 1, the slope of linear output characteristics of the sensor unit 1 becomes larger than the slope of the ideal output characteristics 30 of the sensor chip (see reference numeral 154 in FIG. 12A). The linear output characteristics of the sensor unit 1 represent a state where non-linearity of the actual output characteristics 33 of the sensor unit 1 (the non-linearity error $\Delta$Vsenout1=0) is not exhibited. Therefore, the non-linearity error $\Delta$Vsenout1 of the actual output characteristics 33 of the sensor unit 1 is a negative error (FIG. 4B). The operation principle of the sensor chip is to convert a physical quantity (e.g., mechanical stress in the case of a pressure sensor stress) into an electrical signal. The non-linearity error $\Delta$Vsenout1 of the actual output characteristics 33 of the sensor unit 1 is maximal at the intermediate pressure Pmid between the lower limit value Pmin and the upper limit value Pmax of the pressure detectable by the sensor unit 1.

Thus, non-linearity error $\Delta$Vout1 of the output characteristics of the sensor chip is a sum of the non-linearity error $\Delta$Vsenout1 of the actual output characteristics 33 of the sensor unit 1 and the non-linearity error $\Delta$Vopout1 of the actual output characteristics 31 of the amplifier circuit 2 deliberately generated at the amplifier circuit 2 ($\Delta$Vout1=$\Delta$Vsenout1+$\Delta$Vopout1). Therefore, the resistance value Rs2 of the first resistor 8 is set such that the sum of the non-linearity error $\Delta$Vsenout1 of the actual output characteristics 33 of the sensor unit 1 and the non-linearity error $\Delta$Vopout1 of the actual output characteristics 31 of the amplifier circuit 2 (difference of the absolute values of the non-linearity errors $\Delta$Vsenout1, $\Delta$Vopout1) approaches zero. In particular, the resistance value Rs2 of the first resistor 8 may be set such that the non-linearity of the actual output characteristics of the sensor unit 1 and the non-linearity of the actual output characteristics of the amplifier circuit 2 become substantially linearly symmetric with respect to an axis defined by the ideal output characteristics of the sensor chip. As a result, the non-linearity error $\Delta$Vout1 of the output characteristics of the sensor chip can be reduced. Additionally, the slope of output characteristics not exhibiting non-linearity (linear output characteristics) obtained by combining the actual output characteristics 33, 31 of the sensor unit 1 and the amplifier circuit 2 can be made closer to the slope of the ideal output characteristics 30 of the sensor chip. Therefore, the non-linearity of the final output of the product (the semiconductor physical quantity sensor device) can be improved. FIG. 4B depicts a state in which the non-linearity error $\Delta$Vsenout1 of the actual output characteristics 33 of the sensor unit 1 is canceled by the non-linearity error $\Delta$Vopout1 of the actual output characteristics 31 of the amplifier circuit 2 to achieve the ideal output characteristics 30 of the sensor chip, i.e., the state in which the non-linearity error $\Delta$Vout1 of the output characteristics of the sensor chip is zero ($\Delta$Vout1=0).

As described above, according to the first embodiment, by connecting the first power source wiring, which is connected to the high potential sides of the sensor unit and the characteristic correction circuit, and the second power source wiring, which is connected to the high potential sides of the amplifier circuit and the reference voltage circuit, to the power source terminal in parallel and by connecting the resistor having a predetermined resistance value between the second power source wiring and the power source terminal, the non-linearity of the output characteristics of the amplifier circuit can be deliberately generated to have a predetermined non-linearity error. Therefore, the output characteristics of the amplifier circuit can be adjusted to exhibit non-linearity having a convex-shaped curve in the positive direction. In particular, while the non-linearity error of the output characteristics of the sensor unit is generated as a negative error based on the operation principle of the front-surface pressure sensor chip, the non-linearity error of the output characteristics of the amplifier circuit can deliberately be adjusted to a positive error. Therefore, the non-linearity error of the output characteristics of the sensor unit is combined with the non-linearity error of the output characteristics of the amplifier circuit, so that the non-linearity error of the output characteristics of the sensor chip approaches zero. Therefore, the output characteristics of the sensor chip can be made closer to the linear output characteristics of the sensor chip. By setting the first resistor such that the linear output characteristics of the sensor unit and the linear output characteristics of the amplifier circuit are reverse characteristics to each other across the axis defined by the ideal output characteristics of the sensor chip, the output characteristics of the amplifier circuit are combined with the output characteristics of the sensor unit. As a result, since the output characteristics of the sensor chip approach the ideal output characteristics, the non-linearity of the output characteristics of the sensor chip can be reduced. Additionally, if the linear output characteristics of the sensor unit and the linear output characteristics of the amplifier circuit are substantially linearly symmetric with respect to an axis defined by the ideal output characteristics of the sensor chip, the linearity of the output characteristics of the sensor unit and the output characteristics of the amplifier circuit can be canceled by the non-linearity of the output characteristics of the amplifier circuit.

As described above, according to the first embodiment, the non-linearity of the output characteristics of the sensor chip can be reduced as compared to conventional sensor chips, and the filter resistor connected to the third power source wiring acts as a low-pass filter removing radio noise input to the power source terminal. Therefore, trade-off between the measure against electromagnetic wave noise and the reduction in the non-linearity of the output characteristics of the sensor chip can be improved. According to the first embodiment, since the filter resistor is not connected to the second power source wiring connected to the high potential side of the amplifier circuit, output characteristics of the amplifier circuit are not adversely affected by voltage drop at the filter resistor. Therefore, the output characteristics of the amplifier circuit and the internal circuits upstream therefrom can be adjusted under conditions different from the output characteristics of the sensor unit, facilitating circuit design. According to the first embodiment, since the separation of the power source wirings and the addition of the resistor enable reduction of the non-linearity of the output characteristics of the sensor chip, the number of the internal circuits mounted on the sensor chip does not increase. As a result, the circuit scale decreases, no additional processes are needed, and the sensor chip does not increase in size. Therefore, the chip size and the manufacturing cost can be reduced. Since the number of the internal circuits mounted on the sensor chip does not increase, the internal high-potential voltage supplied to the sensor unit can be maintained and therefore, the sensor sensitivity can be prevented from decreasing.

Figure 5:
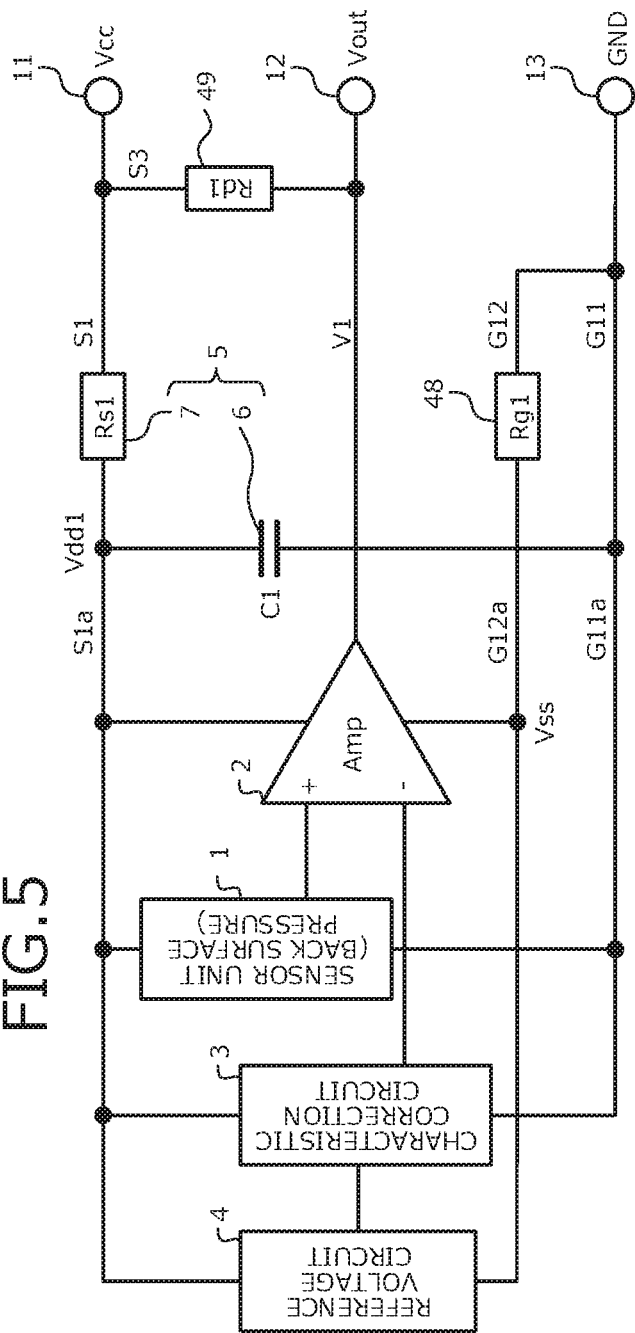
FIG. 5 is a circuit diagram of a configuration of a semiconductor physical quantity sensor device according to a second embodiment.

Configuration of a semiconductor physical quantity sensor device according to a second embodiment will be described. FIG. 5 is a circuit diagram of a configuration of the semiconductor physical quantity sensor device according to the second embodiment. The semiconductor physical quantity sensor device according to the second embodiment differs from the semiconductor physical quantity sensor device according to the first embodiment in that the device has a wiring configuration for using a sensor chip of a typical configuration of a back-surface pressure type sensor to which pressure is applied from the back surface side (a recess portion side of a diaphragm).

The output characteristics of the sensor unit 1 exhibit non-linearity having a convex-shaped curve in the positive direction based on the operation principle of the back-surface pressure sensor chip. Therefore, the semiconductor physical quantity sensor device according to the second embodiment has a configuration causing the internal circuits to operate such that the output characteristics of the amplifier circuit 2 exhibit non-linearity having a convex-shaped curve in the negative direction. For example, the semiconductor physical quantity sensor device according to the second embodiment differs from the semiconductor physical quantity sensor device according to the first embodiment on the following two points.

A first difference is that instead of connecting two power source wirings to a power source terminal in parallel, two ground wirings (hereinafter, first and second ground wirings) G11a, G12a are electrically connected to the ground terminal 13. The first ground wiring G11a is connected to the low potential sides of the sensor unit 1 and the characteristic correction circuit 3, and the second ground wiring G12a is connected to the low potential sides of the amplifier circuit 2 and the reference voltage circuit 4. The high potential sides of the sensor unit 1, the amplifier circuit 2, the characteristic correction circuit 3, and the reference voltage circuit 4 are connected to power source wiring (hereinafter, first power source wiring) S1a.

The first ground wiring G11a is connected through third ground wiring G11 to the ground terminal 13. The first ground wiring G11a is supplied with the ground voltage GND from the ground terminal 13 via the third ground wiring G11. The second ground wiring G12a is connected through fourth ground wiring G12 to the ground terminal 13. The second ground wiring G12a is supplied with ground voltage GND from the ground terminal 13 via the fourth ground wiring G12 and a resistor (hereinafter, third resistor) 48 connected to the fourth ground wiring G12.

Figure 7B:
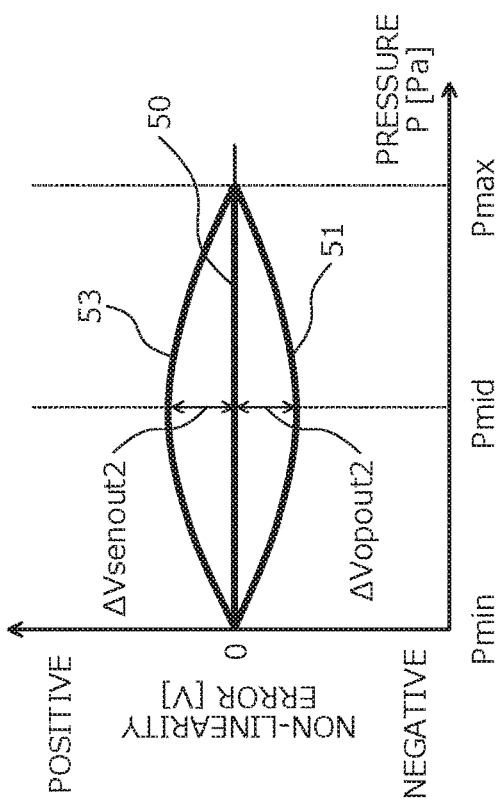
FIGS. 7A and 7B are characteristic diagrams of the operation of the semiconductor physical quantity sensor device according to the second embodiment.
Figure 7A:
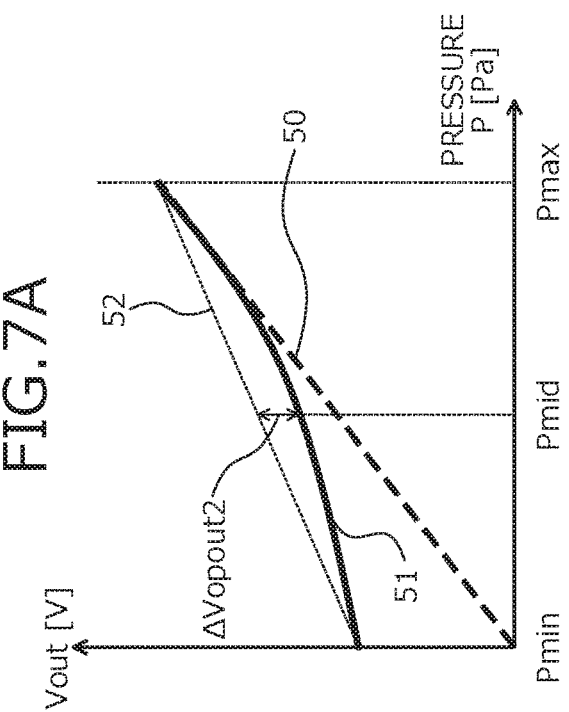

The third resistor 48 has a function of increasing an apparent potential difference (internal low-potential voltage Vss) between the second ground wiring G12a and the ground wiring G11 by a voltage drop and causing the output characteristics of the amplifier circuit 2 to generate non-linearity having a convex-shaped curve in the negative direction (a negative error) with a predetermined no-linearity error $\Delta$Vopout2 (see FIG. 7A described later). The no-linearity error $\Delta$Vopout2 of the output characteristics of the amplifier circuit 2 is adjusted by a resistance value Rg1 of the third resistor 48. The resistance value Rg1 of the third resistor 48 may be adjusted by connecting multiple third resistors 48 in series to the fourth ground wiring G12.

The first power source wiring S1a is connected through power source wiring (hereinafter, third power source wiring) S1 to the power source terminal 11. The CR filter 5 made up of the capacitor 6 and the filter resistor 7 is connected to the third power source wiring S1, in a single-stage configuration, for example. The filter resistor 7 is connected to the third power source wiring S1. The capacitor 6 has a positive electrode connected between the filter resistor 7 and the amplifier circuit 2 and a negative electrode connected between the sensor unit 1 and the ground terminal 13.

The third and fourth ground wirings G11, G12 may be configured such that the fourth ground wiring G12 is connected to a connection point on the third ground wiring G11 or such that the third ground wiring G11 is connected to a connection point on the fourth ground wiring G12. Alternatively, both the third and fourth ground wirings G11, G12 may be connected at one point of the ground terminal 13 to achieve so-called single-point ground wiring (single-point grounding) so that a common impedance is eliminated. FIG. 5 depicts a configuration in which the fourth ground wiring G12 is connected to a connection point on the third ground wiring G11.

A second difference is that a resistor (hereinafter, fourth resistor) 49 acting as a feed-back resistor is connected between the power source terminal 11 and the output terminal 12 instead of between the output terminal 12 and the ground terminal 13. The fourth resistor 49 is connected to power source wiring (hereinafter, fifth power source wiring) S3 connected between the power source terminal 11 and the output terminal 12. The amount of increased current allowed to flow into the output terminal of the amplifier circuit 2 relative to the output voltage Vout of the amplifier circuit 2 is adjusted by a resistance value Rd1 of the fourth resistor 49. The non-linearity of the output characteristics of the amplifier circuit 2 can also be adjusted by the resistance value Rd1 of the fourth resistor 49.

Although the resistance value Rd1 of the fourth resistor 49 may be adjusted by connecting multiple fourth resistors 49 in series to the fifth power source wiring S3, the one fourth resistor 49 may be connected to the fifth power source wiring S3. This is because the resistor may be made to act as a pull-down resistor for detecting a disconnection failure when ground wiring to an external circuit sharing the three terminals 11 to 13 fails as described later. Therefore, the one fourth resistor 49 may be connected to the fifth power source wiring S3 so that the non-linearity of the output characteristics of the amplifier circuit 2 is adjusted by the resistance value Rg1 of the third resistor 48.

Figure 6:
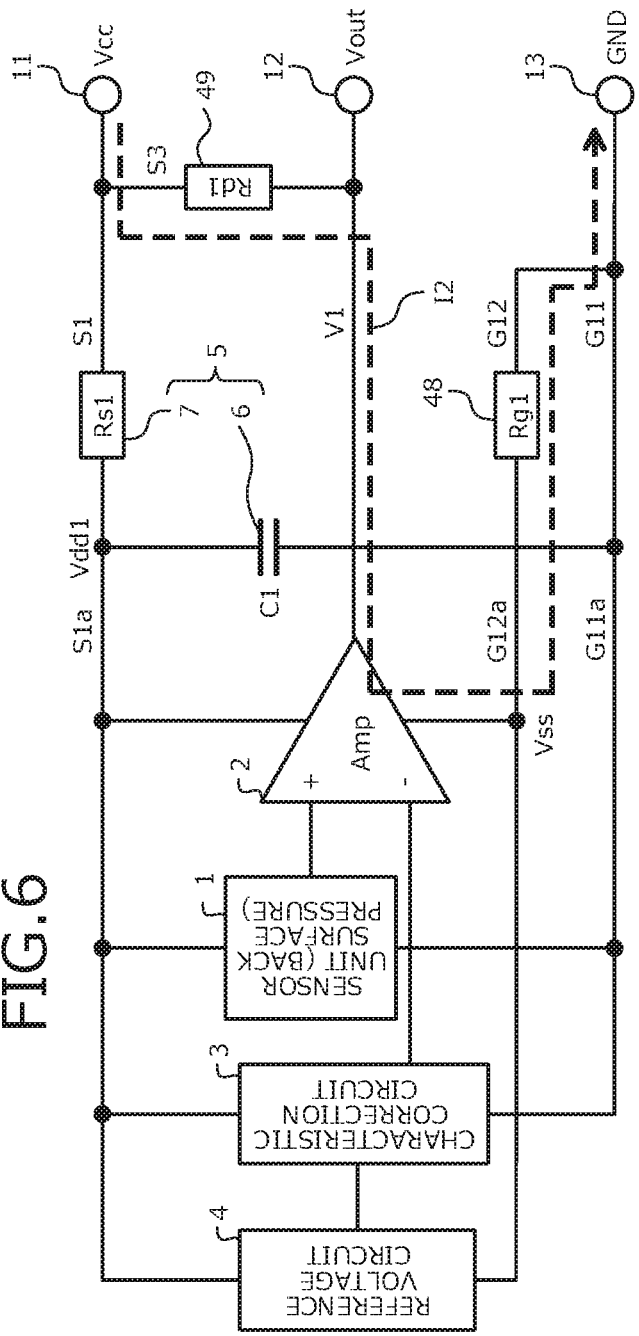
FIG. 6 is an explanatory diagram of the operation of the semiconductor physical quantity sensor device according to the second embodiment.

Operation of the semiconductor physical quantity sensor device according to the second embodiment will be described. FIG. 6 is an explanatory diagram of the operation of the semiconductor physical quantity sensor device according to the second embodiment. FIGS. 7A and 7B are characteristic diagrams of the operation of the semiconductor physical quantity sensor device according to the second embodiment. In FIG. 6, the flow of the current I2 is indicated by a dashed lined arrow. As described above, since the amplifier circuit 2 is of the push-pull output type and the fourth resistor 49 is connected between the output terminal of the amplifier circuit 2 and the power source terminal 11, the current flowing from the output terminal of the amplifier circuit 2 into the amplifier circuit 2 increases with a decrease in the output voltage Vout of the amplifier circuit 2. As depicted in FIG. 6, current flowing from the output terminal of the amplifier circuit 2 into the amplifier circuit 2 flows from a ground terminal of the amplifier circuit 2 via the second ground wiring G12a and the third resistor 48 to the ground terminal 13. The current I2 (=Vout/Rd1) is extracted from the power source terminal 11 according to the resistance value Rd1 of the fourth resistor 49. Therefore, the amount ΔI2 of increased current I2 flowing through the second ground wiring G12a via the amplifier circuit 2 is determined by the resistance value Rd1 of the fourth resistor 49.

As the current I2 flowing through the second ground wiring G12a via the amplifier circuit 2 increases, voltage drop at the third resistor 48 increases. As a result, the potential difference (the internal low-potential voltage Vss) between the second ground wiring G12a and the ground wiring G11 increases by the amount of voltage drop at the third resistor 48. In particular, as the current I2 flowing through the second ground wiring G12a via the amplifier circuit 2 increases, the apparent ground potential of the second ground wiring G12a increases. To set the amount of increase of the current I2 flowing through the second ground wiring G12a via the amplifier circuit 2, the dependency on the potential of the second ground wiring G12a is known in advance in terms of the non-linearity of the output characteristics of the amplifier circuit 2. The resistance value Rg1 of the third resistor 48 may be set such that the output characteristics of the amplifier circuit 2 have the non-linearity of reverse characteristics so as to cancel the non-linearity of the output characteristics of the sensor unit 1. In particular, the resistance value Rg1 of the third resistor 48 may set such that the absolute value of the non-linearity error of the output characteristics of the sensor unit 1 becomes substantially the same as the absolute value of the non-linearity error of the output characteristics of the amplifier circuit 2.

As the apparent potential difference of the second ground wiring G12a and the ground wiring G11 increases, the internal low-potential voltage Vss supplied to the reference voltage circuit 4 increases. As the internal low-potential voltage Vss supplied to the reference voltage circuit 4 increases, the voltage supplied from the characteristic correction circuit 3 to the inverting input terminal of the amplifier circuit 2 increases. Therefore, the correction amount for the amplifier circuit 2 supplied from the characteristic correction circuit 3 to the amplifier circuit 2 increases by the amount ΔVss (=ΔI2×Rg1) of increase of the internal low-potential voltage Vss due to the voltage drop at the third resistor 48.

As described above, both the voltage supplied from the characteristic correction circuit 3 to the inverting input terminal of the amplifier circuit 2 and the internal low-potential voltage Vss supplied to the ground terminal of the amplifier circuit 2 are increased based on the resistance values Rg1, Rd1 of the third and fourth resistors 48, 49. As a result, actual output characteristics 51 of the amplifier circuit 2 exhibit non-linearity having a convex-shaped curve in the negative direction (i.e., a concave-shaped curve in the positive direction) with a predetermined non-linearity error ΔVopout2. Additionally, because of the increase in the internal low-potential voltage Vss supplied to the amplifier circuit 2, linear output characteristics 52 of the amplifier circuit 2 have a smaller slope and a larger intercept as compared to ideal output characteristics 50 of the sensor chip. The linear output characteristics 52 of the amplifier circuit 2 represent a state where the non-linearity of the actual output characteristics 51 of the amplifier circuit 2 (the non-linearity error ΔVopout2=0) is not exhibited. The ideal output characteristics 50 of the sensor chip represent a state without a divergence from the ideal linear equation of the output characteristics of the sensor chip. In particular, by adjusting the resistance values Rg1, Rd1 of the third and fourth resistors 48, 49, the non-linearity error ΔVopout2 of the actual output characteristics 51 of the amplifier circuit 2 is deliberately generated as a negative error (FIG. 7A). The non-linearity error ΔVopout2 of the actual output characteristics 51 of the amplifier circuit 2 is maximal at the intermediate pressure Pmid between the lower limit value Pmin and the upper limit value Pmax of a physical quantity (depicted as pressure in FIGS. 7A and 7B) detectable by the sensor unit 1.

On the other hand, based on the operation principle of the back-surface pressure sensor chip, actual output characteristics 53 of the sensor unit 1 exhibit non-linearity having a convex-shaped curve in the positive direction with the non-linearity error ΔVsenout2. Additionally, because of the amount ΔVdd1 of decrease of the internal high-potential voltage Vdd1 supplied to the sensor unit 1, the slope of linear output characteristics of the sensor unit 1 becomes smaller than the slope of the ideal output characteristics 50 of the sensor chip (see reference numeral 152 of FIGS. 12A and 12B). The linear output characteristics of the sensor unit 1 represent a state where non-linearity of the actual output characteristics 53 of the sensor unit 1 (the non-linearity error ΔVsenout2=0) is not exhibited. Therefore, the non-linearity error ΔVsenout2 of the actual output characteristics 53 of the sensor unit 1 is a positive error (FIG. 7B). The non-linearity error ΔVsenout2 of the actual output characteristics 53 of the sensor unit 1 is maximal at the intermediate pressure Pmid between the lower limit value Pmin and the upper limit value Pmax of the pressure detectable by the sensor unit 1. The current I2 flowing from the fourth resistor 49 via the output wiring V1 to the amplifier circuit 2 is not involved with the first and second power source wirings S1a, S1 and therefore, no voltage variation occurs in the first and second power source wirings S1a, S1 due to this current I2.

Thus, similar to the first embodiment, a non-linearity error ΔVout2 of the output characteristics of the sensor chip is a sum of the non-linearity error ΔVsenout2 of the actual output characteristics 53 of the sensor unit 1 and the non-linearity error ΔVopout2 of the actual output characteristics 51 of the amplifier circuit 2 deliberately generated in the amplifier circuit 2 (ΔVout2=ΔVsenout2+ΔVopout2). Therefore, the third resistor 48 is set such that the sum of the non-linearity error ΔVsenout2 of the actual output characteristics 53 of the sensor unit 1 and the non-linearity error ΔVopout2 of the actual output characteristics 51 of the amplifier circuit 2 approaches zero. In particular, the resistance value Rg1 of the third resistor 48 may be set such that the non-linearity of the actual output characteristics of the sensor unit 1 and the non-linearity of the actual output characteristics of the amplifier circuit 2 become substantially linearly symmetric with respect to an axis defined by the ideal output characteristics of the sensor chip. As a result, the non-linearity error ΔVout2 of the output characteristics of the sensor chip can be reduced. Additionally, the slope of output characteristics not exhibiting non-linearity (linear output characteristics) obtained by combining the actual output characteristics 53, 51 of the sensor unit 1 and the amplifier circuit 2 can be made closer the slope of the ideal output characteristics 50 of the sensor chip. Therefore, the non-linearity of the final output of the product can be improved. FIG. 7B depicts a state in which the non-linearity error ΔVsenout2 of the actual output characteristics 53 of the sensor unit 1 is canceled by the non-linearity error ΔVopout2 of the actual output characteristics 51 of the amplifier circuit 2 to achieve the ideal output characteristics 50 of the sensor chip, i.e., the state in which the non-linearity error ΔVout2 of the output characteristics of the sensor chip is zero (ΔVout2=0).

As described above, according to the second embodiment, effects identical to those of the first embodiment can be achieved even when a back-surface pressure sensor chip is used.

Figure 8:
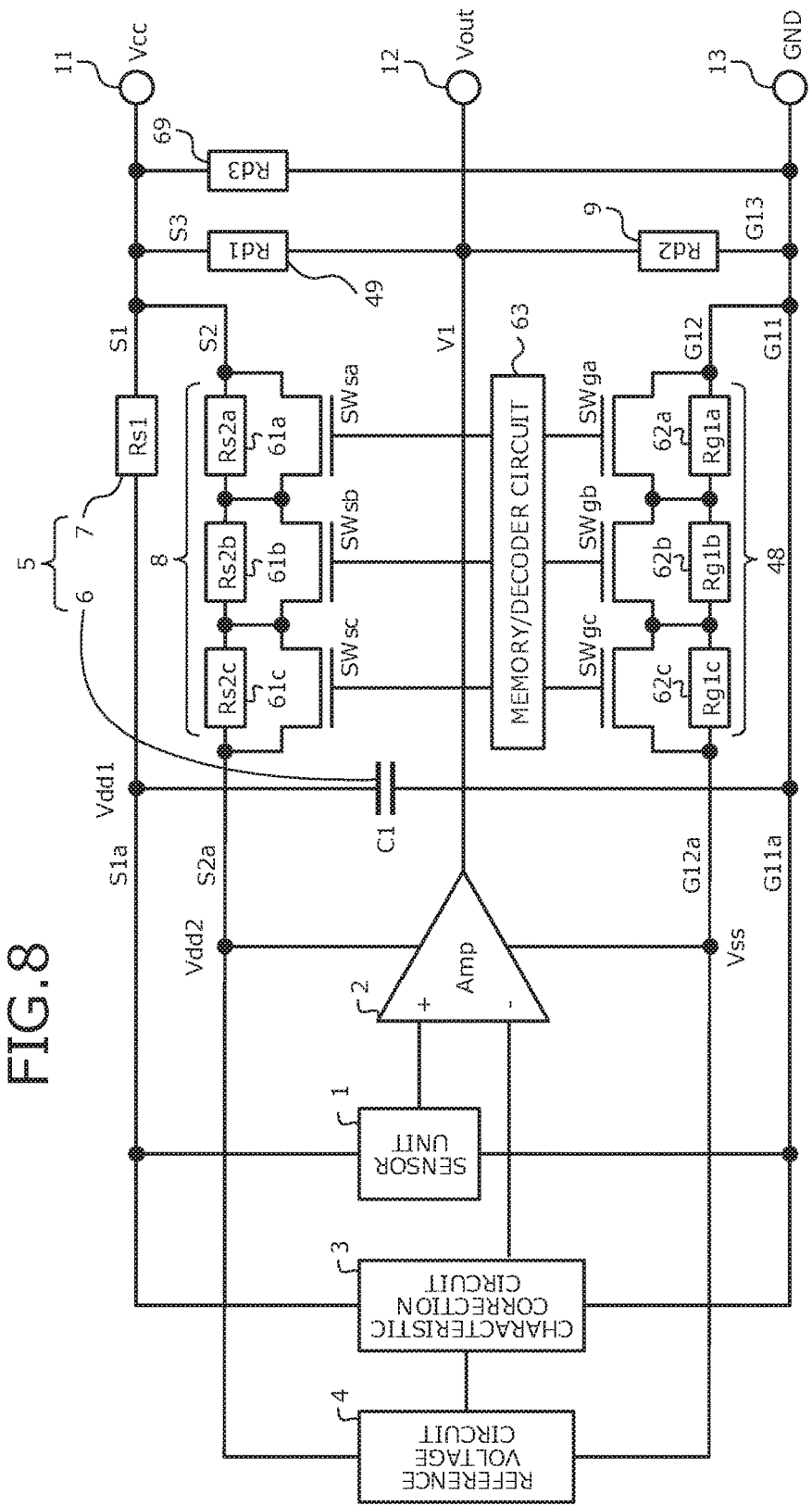
FIG. 8 is a circuit diagram of a configuration of a semiconductor physical quantity sensor device according to a third embodiment.

Configuration of a semiconductor physical quantity sensor device according to a third embodiment will be described. FIG. 8 is a circuit diagram of a configuration of the semiconductor physical quantity sensor device according to the third embodiment. The semiconductor physical quantity sensor device according to the third embodiment is obtained by applying the second embodiment to the first embodiment. Therefore, the semiconductor physical quantity sensor device according to the third embodiment has a wiring configuration (the first and second resistors 8, 9) for using a front-surface pressure sensor chip and a wiring configuration (the third and fourth resistors 48, 49) for using a back-surface pressure sensor chip.

In particular, similar to the first embodiment, the first power source wiring S1a connected to the high potential sides of the sensor unit 1 and the characteristic correction circuit 3, and the second power source wiring S2a connected to the high potential sides of the amplifier circuit 2 and the reference voltage circuit 4, are electrically connected to the power source terminal 11 in parallel. The first and second power source wirings S1a, S2a are respectively connected through the third and fourth power source wirings S1, S2 to the power source terminal 11. The CR filter 5 is connected to the third power source wiring S1, and the first resistor 8 is connected to the fourth power source wiring S2. The second resistor 9 is connected to a ground wiring (hereinafter, fifth ground wiring) G13 connected between the output terminal 12 and the ground terminal 13.

Additionally, similar to the second embodiment, the first ground wiring G11a connected to the low potential sides of the sensor unit 1 and the characteristic correction circuit 3, and the second ground wiring G12a connected to the low potential sides of the amplifier circuit 2 and the reference voltage circuit 4, are electrically connected to the ground terminal 13 in parallel. The first and second ground wirings G11a, G12a are respectively connected through the third and fourth ground wirings G11, G12 to the ground terminal 13. The third resistor 48 is connected to the fourth ground wiring G12. The fourth resistor 49 is connected to the power source wiring (hereinafter, fifth power source wiring) S3 connected between the power source terminal 11 and the output terminal 12.

In the third embodiment, multiple (in this example, three) resistive elements 61a to 61c are connected in series as the first resistor 8 to the fourth power source wiring S2. To both ends of each of the resistive elements 61a to 61c, switches SWsa to SWsc are connected in parallel with the resistive elements 61a to 61c, respectively. Multiple (in this example, three) resistive elements 62a to 62c are connected in series as the third resistor 48 to the fourth ground wiring G12. To both ends of each of the resistive elements 62a to 62c, switches SWga to SWgc are connected in parallel with the resistive elements 61a to 61c, respectively. The number of resistive elements making up each of the first and third resistors 8, 48 may be changed variously according to specifications.

The switches SWsa to SWsc, SWga to SWgc switch the respective resistive elements 61a to 61c, 62a to 62c between enabled and disabled. The switches SWsa to SWsc, SWga to SWgc are MOSFETs fabricated on the sensor chip, for example. Each of the switches SWsa to SWsc, SWga to SWgc are connected to a memory/decoder circuit (control circuit) 63. The memory/decoder circuit 63 stores information related to combinations of ON/OFF of the switches SWsa to SWsc, SWga to SWgc. Based on the information, the memory/decoder circuit 63 controls gate voltages supplied to the switches SWsa to SWsc, SWga to SWgc to adjust the resistance values of the first and third resistors 8, 48.

For example, if the front-surface pressure sensor chip is used, the memory/decoder circuit 63 turns on the switches SWga to SWgc to disable the resistive elements 62a to 62c connected to the fourth ground wiring G12, thereby making the resistance value on the ground wiring side lower, and turns off the switches SWsa to SWsc to enable the resistive elements 61a to 61c connected to the fourth power source wiring S2, thereby making the resistance value on the power source wiring side higher. As a result, effects identical to those of the first embodiment are achieved. Which switch is turned off among the switches SWsa to SWsc in this case can be changed variously according to the non-linearity error of the output characteristics of the sensor chip and the manufacturing variations of the internal circuits. Therefore, a combined resistance (resistance values Rs2a to Rs2c) of the resistive elements 61a to 61c may be adjusted to adjust the degree of non-linearity of the output characteristics of the amplifier circuit 2 in stages.

On the other hand, if the back-surface pressure sensor chip is used, the memory/decoder circuit 63 turns on the switches SWsa to SWsc to disable the resistive elements 61a to 61c connected to the fourth power source wiring S2, thereby making the resistance value on the power source wiring side lower, and turns off the switches SWga to SWgc to enable the resistive elements 62a to 62c connected to the fourth ground wiring G12, thereby making the resistance value on the ground wiring side higher. As a result, effects identical to those of the second embodiment are achieved. Which switch is turned off among the switches SWga to SWgc in this case can be changed variously according to the non-linearity error of the output characteristics of the sensor chip and the manufacturing variations of the internal circuits. Therefore, a combined resistance (resistance values Rg1a to Rg1c) of the resistive elements 62a to 62c may be adjusted to adjust the degree of non-linearity of the output characteristics of the amplifier circuit 2 in stages.

Additionally, all the switches SWsa to SWsc, SWga to SWgc may be turned on to disable all the resistive elements 61a to 61c, 62a to 62c connected to the fourth power source wiring S2 and the fourth ground wiring G12. This leads to a minimum state in which the non-linearity of the output characteristics of the amplifier circuit 2 is generated only by the circuit configuration of the sensor chip (i.e., a state in which the non-linearity is deliberately not generated). The output characteristics of a product measured in this state are the non-linearity of the output characteristics of the sensor unit 1. Therefore, after the non-linearity of the output characteristics of the sensor unit 1 is preliminarily detected and comprehended in advance, the ON/OFF state of the switches SWsa to SWsc, SWga to SWgc can be determined.

For example, first, all the switches SWsa to SWsc, SWga to SWgc are turned on by the memory/decoder circuit 63 to disable all the resistive elements 61a to 61c, 62a to 62c. While all the resistive elements 61a to 61c, 62a to 62c are disabled, the output characteristics of the product are measured to preliminarily obtain the non-linearity of the output characteristics of the sensor unit 1. Based on the preliminarily obtained non-linearity of the output characteristics of the sensor unit 1, an ON/OFF condition of the switches SWsa to SWsc, SWga to SWgc is tentatively determined (provisionally determined). The ON/OFF condition of the switches is a combination of ON/OFF of the switches SWsa to SWsc, SWga to SWgc. For example, if the front-surface pressure sensor chip is used, the ON/OFF condition of the switches is to turn on all the switches SWga to SWgc and turn off one or more of the switches SWsa to SWsc. Subsequently, the output characteristics of the product are measured under multiple ON/OFF conditions of the switches in which the resistance value of the first resistor 8 (or the third resistor 48) is increased/decreased based on the tentatively determined ON/OFF condition of the switches SWsa to SWsc, SWga to SWgc. From these measurement results, the ON/OFF condition of the switches SWsa to SWsc, SWga to SWgc with the smallest non-linearity error may be determined. In this situation, variations of the output characteristics of the sensor unit 1 are finely adjusted and, additionally, variations of the output characteristics of the amplifier circuit 2 are finely adjusted. As a result, the non-linearity can be adjusted according to variations of the output characteristics of the sensor unit 1 and the amplifier circuit 2 in individual products. Therefore, the adjustment precision of the output characteristics of the sensor chip can be improved.

A resistor (hereinafter, fifth resistor) 69 is connected between the power source terminal 11 and the ground terminal 13. The second, fourth, and fifth resistors 9, 49, 69 act as a pull-up resistor or a pull-down resistor for detecting a disconnection failure when power source or ground wiring to an external circuit sharing the three terminals 11 to 13 fails (for example, refer to Japanese Laid-Open Patent Publication No. 2003-304633). Therefore, the second and fourth resistors 9, 49 have a function of improving the non-linearity of the output characteristics of the sensor chip and a function of detecting the disconnection failure. Thus, multiple functions can be implemented without significantly increasing the number of elements and, the chip size and the manufacturing cost can be reduced.

The present invention is not limited to the embodiments described above and can be modified variously without departing from the spirit of the present invention. For example, although the CR filter is connected to each wiring in a single-stage configuration in the examples in the embodiments described above, the CR filter may have a multistage configuration like a quadratic filter or a n-type (CRC) configuration. Although the piezoresistance type sensor chip using a piezoelectric effect of silicon (Si) is included in the examples in the embodiments described above, a capacitance type sensor chip using a parallel plate or a sensor chip using a resistance-wire strain gauge may be used instead of the piezoresistance type sensor chip.

Figure 9B:
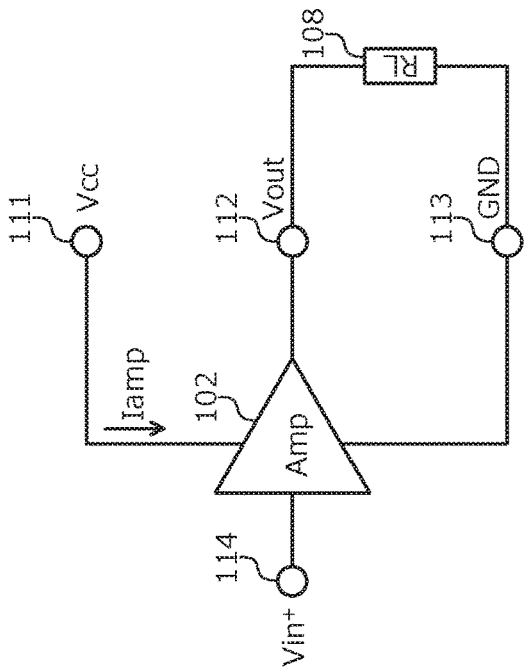
FIGS. 9A and 9B are explanatory diagrams of an example of consumption current characteristics of a push-pull output type operational amplifier.
Figure 9A:
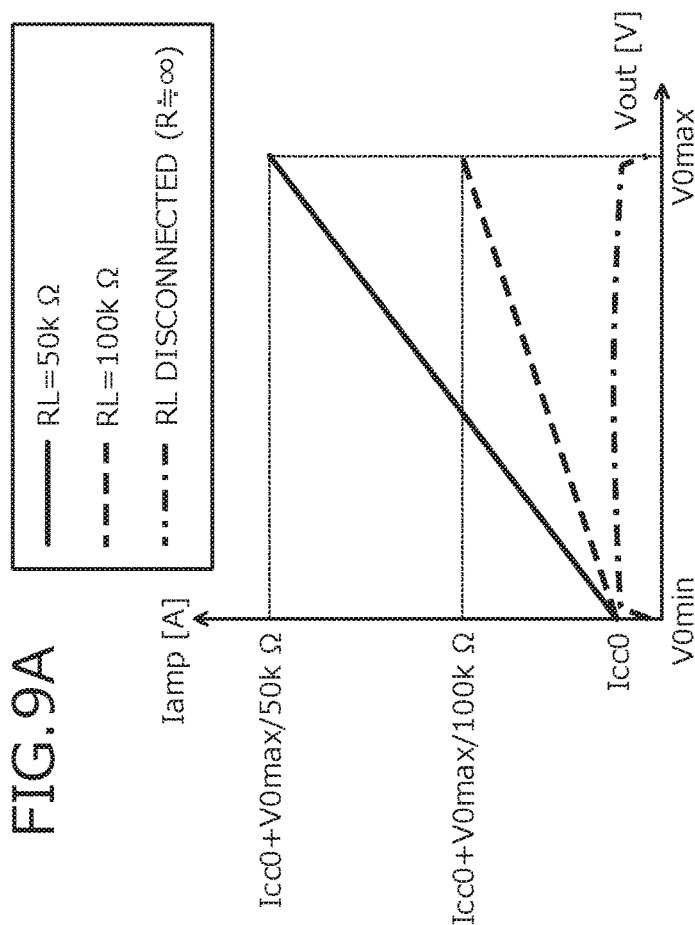

However, if the push-pull output type operational amplifier as described in Japanese Laid-Open Patent Publication No. 2004-222015 is applied to Japanese Laid-Open Patent Publication Nos. 2006-310658 and 2006-162421, the following problem arises. FIGS. 9A and 9B are explanatory diagrams of an example of consumption current characteristics of a push-pull output type operational amplifier. FIG. 9A depicts the consumption current characteristics of the operational amplifier 102 when a resistor (feed-back resistor) 108 is connected between an output terminal and a ground terminal of the push-pull output type operational amplifier 102 (RL=50 kΩ, 100 kΩ) and when the resistor 108 is not connected (RL≈∞). FIG. 9B depicts a state in which a current Iamp extracted from the power source terminal 111 according to the resistance value RL of the resistor 108 is input to the operational amplifier 102. The operational amplifier 102 consumes the current Iamp to amplify a voltage $Vin^+$ input from a sensor unit (not depicted) connected to a terminal 114 to a non-inverting (+) input terminal of the operational amplifier 102 and outputs the output voltage Vout.

As depicted in FIG. 9A, the consumption current Iamp of the push-pull output type operational amplifier 102 increases in proportion to an increase in the output voltage Vout of the operational amplifier 102. An increment (slope) thereof is substantially unchanged when the resistor 108 is not connected to the operational amplifier 102 (the resistance value RL≈∞) and when the resistor 108 is connected to the operational amplifier 102 to amplify the output voltage Vou, the slope increases the smaller the resistance of the resistor 108 of the operational amplifier 102 is. Therefore, the current Iamp of a current amount based on the resistance value RL of the resistor 108 is extracted from the power source terminal 111 and is input to and consumed by the operational amplifier 102. In FIG. 9A, V0min and V0max are a lower limit value and an upper limit value, respectively, of the output voltage Vout of the operational amplifier 102. Icc0 is the consumption current of the operational amplifier 102 when the source voltage Vcc is not applied to the power source terminal 111 (Vcc=0).

Figure 10:
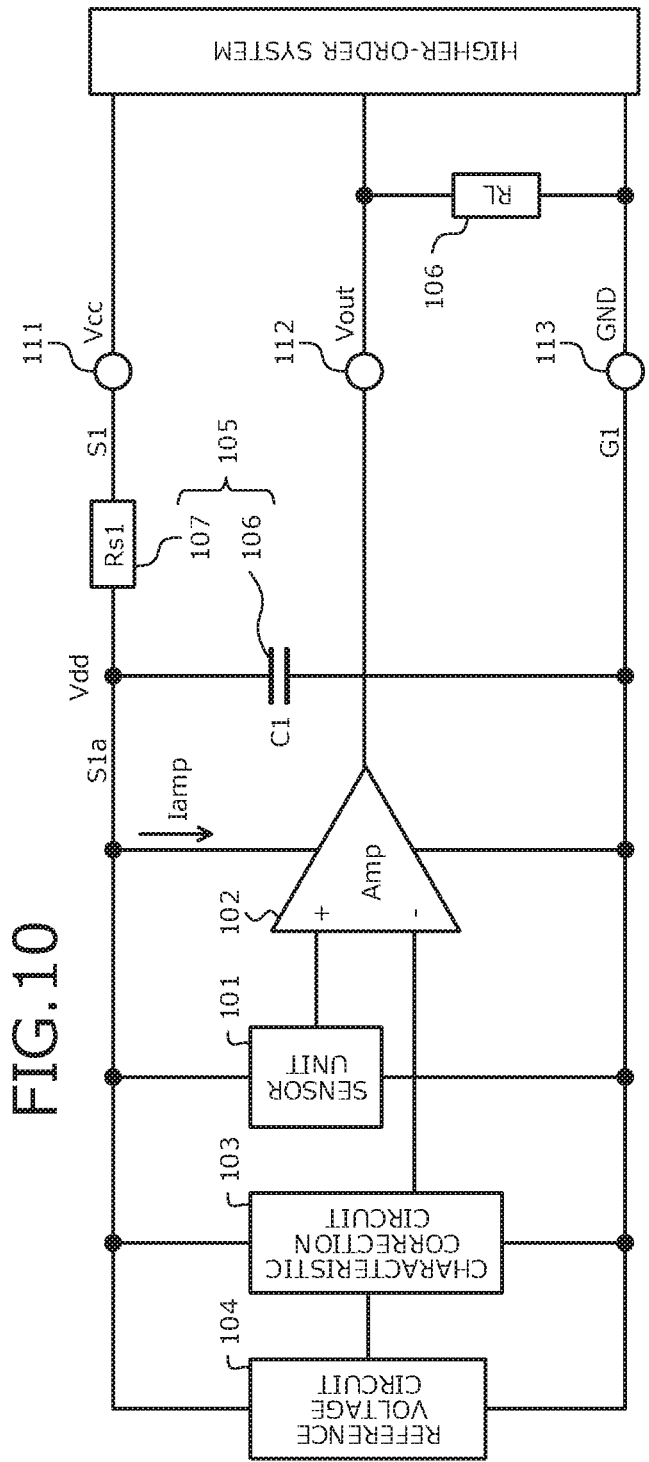
Figure 14:
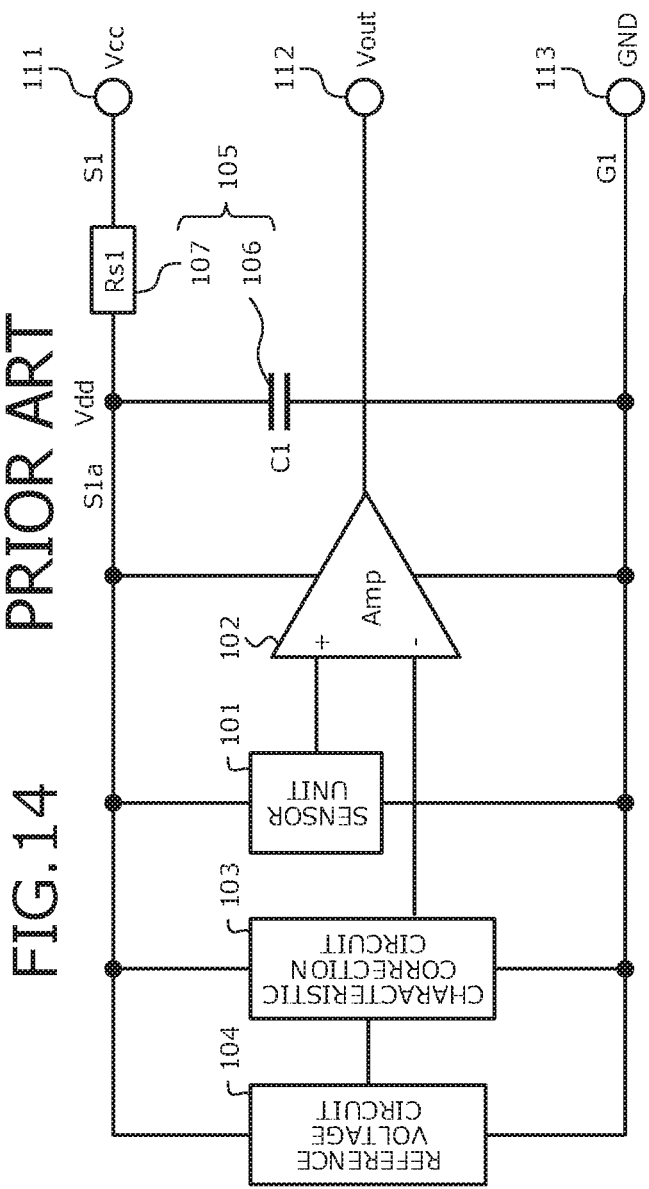
FIG. 14 is a circuit diagram of an example of the conventional semiconductor physical quantity sensor device.

FIGS. 10, 11A, and 11B depict a mechanism of generation of non-linearity when the push-pull output type operational amplifier 102 having such consumption current characteristics is applied to the conventional semiconductor physical quantity sensor device (see FIG. 14). FIGS. 10, 11A, and 11B are explanatory diagrams of the mechanism of generation of non-linearity in the conventional semiconductor physical quantity sensor device. As depicted in FIG. 10, if the CR filter 105 is connected to a power source wiring S1 connecting the push-pull output type operational amplifier 102 and the power source terminal 111, current Iamp, which is consumed by the operational amplifier 102, is input to the operational amplifier 102, via the CR filter 105. Therefore, the output voltage Vout and the consumption current Iamp of the operational amplifier 102 increase (decrease) according to a detected physical quantity. As the consumption current Iamp of the operational amplifier 102 increases (decreases), a voltage drop at the filter resistor 107 increases (decreases).

As a result of an increase (decrease) in the voltage drop at the filter resistor 107, an apparent potential difference (internal high-potential voltage Vdd) between a power source wiring S1a connecting the filter resistor 107 to the internal circuits and a ground wiring G1 decreases (increases) by the amount of increase (decrease) ΔVdd (=ΔIamp×Rs1) of the voltage drop (see FIG. 11A). As a result, the internal high-potential voltage Vdd supplied to the internal circuits decreases. The decrease in the internal high-potential voltage Vdd supplied to the reference voltage circuit 104 leads to a decrease (increase) in the voltage supplied from the characteristic correction circuit 103 to an inverting (−) input terminal of the operational amplifier 102. Because of the decrease (increase) in both the voltage supplied from the characteristic correction circuit 103 to the inverting (−) input terminal of the operational amplifier 102 and the internal high-potential voltage Vdd supplied to the power source terminal of the operational amplifier 102, non-linearity of the output characteristics of the operational amplifier 102 degrades. Therefore, non-linearity error ΔVout of actual output characteristics 131 of the operational amplifier 102 increases and a convex-shaped curve increases in the positive (negative) direction (see FIG. 11B).

Moreover, because of the decrease (increase) in the internal high-potential voltage Vdd supplied to the operational amplifier 102, the slope of linear output characteristics 132 of the operational amplifier 102 becomes smaller (larger) than the slope of ideal output characteristics 130 of the sensor chip. The linear output characteristics 132 of the operational amplifier 102 represent a state where non-linearity of the actual output characteristics 131 of the operational amplifier 102 (the non-linearity error ΔVout=0) is not exhibited. The ideal output characteristics 130 of the sensor chip represent a state without a divergence from the ideal linear equation of the output characteristics of the sensor chip. FIGS. 11A and 11B depict a case where both the output voltage Vout and the consumption current Iamp of the operational amplifier 102 increase, whereby the internal high-potential voltage Vdd decreases by the amount ΔVdd of increase in the voltage drop at the filter resistor 107 while the non-linearity error ΔVout of the output voltage Vout of the operational amplifier 102 exhibits a convex-shaped curve in the positive direction (a positive error). The non-linearity error ΔVout of the actual output characteristics 131 of the operational amplifier 102 is maximal at an intermediate pressure Pmid between a lower limit value Pmin and an upper limit value Pmax of a physical quantity (depicted as pressure in FIGS. 11A and 11B) detectable by the sensor unit 101.

As described above, the increase (decrease) in the consumption current Iamp of the operational amplifier 102 is a factor causing negative feedback (feedback), generating an error in the voltage supplied to the power source terminal and the inverting input terminal of the operational amplifier 102 due to the voltage drop at the filter resistor 107. Therefore, if the operational amplifier 102 of the push-pull output type having a wide output voltage range is used in a conventional semiconductor physical quantity sensor device that includes the CR filter 105 as a measure against electromagnetic wave noise, a mechanism of negative feedback results, causing degradation in the non-linearity of the output characteristics of the operational amplifier 102.

Figure 12A:
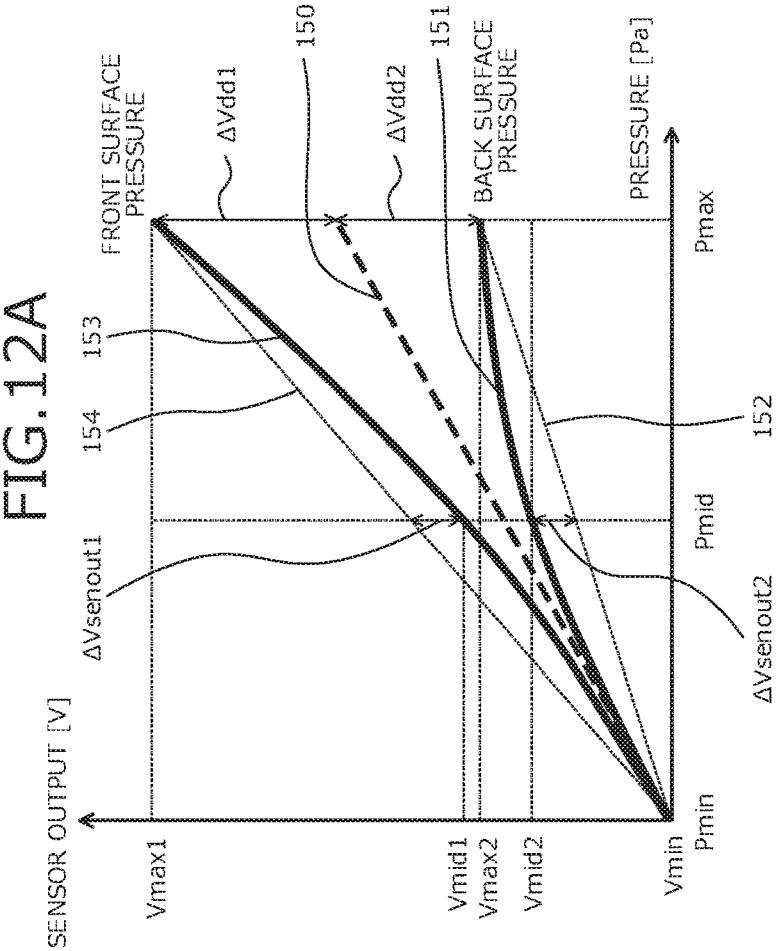
FIGS. 12A and 12B are explanatory diagrams of non-linearity of output characteristics of a sensor unit of the conventional semiconductor physical quantity sensor device.
Figure 12B:
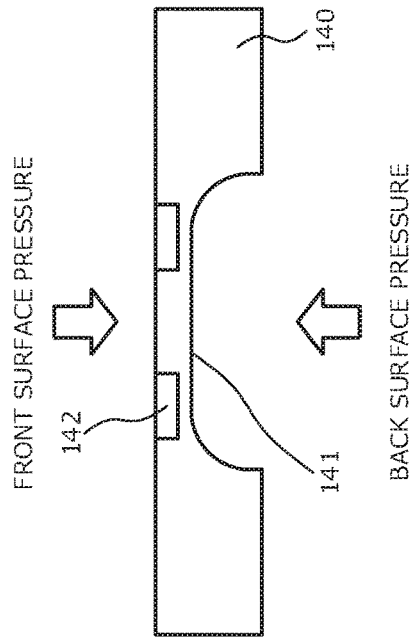

Non-linearity error based on an operation principle of the sensor chip occurs not only in the output characteristics of the operational amplifier 102 but also in the output characteristics of the sensor unit 101. The operation principle of the sensor chip is to convert a physical quantity (e.g., mechanical stress in the case of a pressure sensor stress) into an electrical signal. FIGS. 12A and 12B are explanatory diagrams of the non-linearity of the output characteristics of the sensor unit of the conventional semiconductor physical quantity sensor device. FIG. 12A depicts the non-linearity of the output characteristics of the sensor unit 101 and FIG. 12B depicts a cross-sectional structure of a pressure sensor chip 140.

For example, in general, when pressure is applied from a back surface side (a recess portion side of a diaphragm 141) of the pressure sensor chip 140 (back surface pressure), actual output characteristics 151 of the sensor unit 101 exhibit non-linearity having a convex-shaped curve in the positive direction due to non-linearity error ΔVsenout2. Additionally, because of a decrease ΔVdd2 of the internal high-potential voltage Vdd supplied to the sensor unit 101, the slope of linear output characteristics 152 of the sensor unit 101 becomes smaller than the slope of ideal output characteristics 150 of the pressure sensor chip 140. The linear output characteristics 152 of the sensor unit 101 represent a state where non-linearity of the actual output characteristics 151 of the sensor unit 101 (the non-linearity error ΔVsenout2=0 is not exhibited). The non-linearity error ΔVsenout2 of the actual output characteristics 151 of the sensor unit 101 is maximal at the intermediate pressure Pmid between the lower limit value Pmin and the upper limit value Pmax of the pressure detectable by the sensor unit 101. Vmin, Vmid2, and Vmax2 are output voltages at the pressures Pmin, Pmid, and Pmax, respectively.

On the other hand, when pressure is applied from a front surface side (a semiconductor strain gauge 142 side) of the pressure sensor chip 140 (front surface pressure), actual output characteristics 153 of the sensor unit 101 exhibit non-linearity having a convex-shaped curve in the negative direction (i.e., a concave-shaped curve in the positive direction) due to non-linearity error ΔVsenout1. Additionally, because of an increase ΔVdd1 of an internal high-potential voltage Vdd1 supplied to the sensor unit 101, the slope of linear output characteristics 154 of the sensor unit 101 (the non-linearity error ΔVsenout1=0) becomes larger than the slope of the ideal output characteristics 150 of the pressure sensor chip 140. The non-linearity error ΔVsenout1 of the actual output characteristics 153 of the sensor unit 101 is maximal at the intermediate pressure Pmid between the lower limit value Pmin and the upper limit value Pmax of the pressure detectable by the sensor unit 101. Vmin, Vmid1, and Vmax1 are output voltages at the pressures Pmin, Pmid, and Pmax, respectively.

Therefore, even when the voltage drop at the filter resistor 107 occurs due to an increase (decrease) in the consumption current Iamp of the operational amplifier 102 under the same conditions, the direction of the curve of non-linearity of the output characteristics of the sensor unit 101 differs depending on the direction of pressure applied to the sensor chip. The output of the sensor chip in a form of a final product is the output obtained by combining the non-linearity of the output characteristics of the operational amplifier 102 and the non-linearity of the output characteristics of the sensor unit 101. Thus, since the non-linearity of the output characteristics of the operational amplifier 102 may cancel the non-linearity of the output characteristics of the sensor unit 101 so that the non-linearity of the output characteristics of the sensor chip is reduced (brought closer to zero), the non-linearity of the output characteristics of the operational amplifier 102 do not necessarily degrade the non-linearity of the output characteristics of the sensor chip.

Figure 13A:
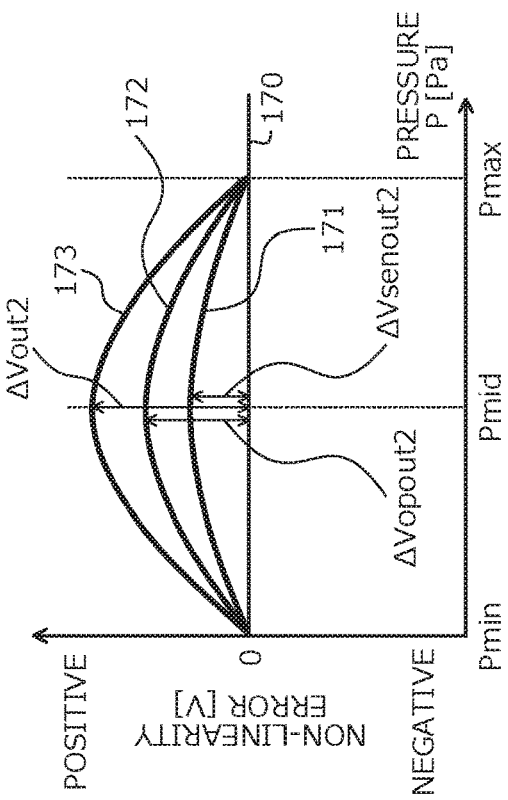
FIGS. 13A and 13B are characteristic diagrams of an example of the non-linearity of the output characteristics of the conventional semiconductor physical quantity sensor device.
Figure 13B:
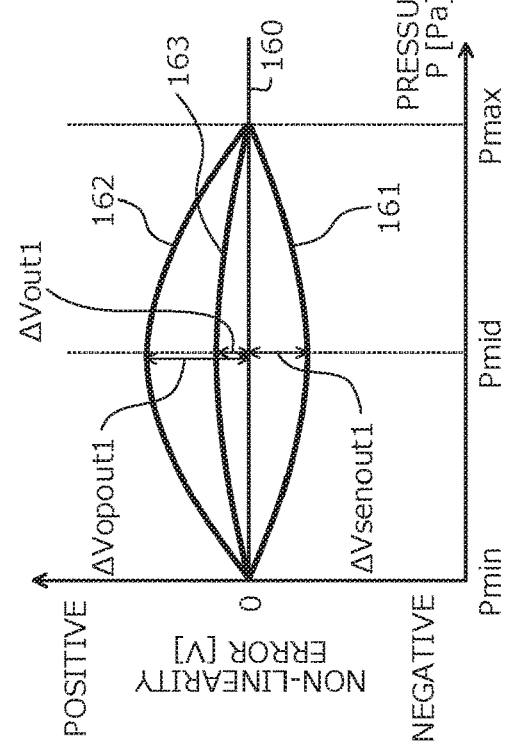

However, if a push-pull output type operational amplifier is employed in Japanese Laid-Open Patent Publication No. 2006-310658, a tradeoff exists between the measure against electromagnetic wave noise and the reduction in the non-linearity of the output characteristics of the sensor chip. FIGS. 13A and 13B are characteristic diagrams of an example of the non-linearity of the output characteristics of the conventional semiconductor physical quantity sensor device. As depicted in FIG. 13A, it is assumed that a front-surface pressure sensor chip is used and that actual output characteristics 162 of the operational amplifier exhibit non-linearity having a convex-shaped curve in the positive direction. In this case, since output characteristics 161 of the sensor unit exhibit non-linearity having a convex-shaped curve in the negative direction, the non-linearity error ΔVsenout1 of the actual output characteristics 161 of the sensor unit is combined with a non-linearity error ΔVopout1 of the actual output characteristics 162 of the operational amplifier, and a non-linearity error ΔVout1 of actual output characteristics 163 of the sensor chip decreases. The non-linearity errors ΔVopout1, ΔVsenout1 are errors based on ideal output characteristics 160 of the sensor chip.

On the other hand, as depicted in FIG. 13B, if a back-surface pressure sensor chip is used, actual output characteristics 171 of the sensor unit exhibit non-linearity having a convex-shaped curve in the positive direction symmetrical to the front-surface pressure sensor chip. Thus, both the actual output characteristics 171 of the sensor unit and actual output characteristics 172 of the operational amplifier exhibit non-linearity having a convex-shaped curve in the positive direction. In this case, a non-linearity error ΔVopout2 of the actual output characteristics 172 of the operational amplifier augments a non-linearity error ΔVsenout2 of the actual output characteristics 171 of the sensor unit, resulting in an increase in a non-linearity error ΔVout2 of actual output characteristics 173 of the sensor chip. The non-linearity errors ΔVopout2, ΔVsenout2 are errors based on ideal output characteristics 170 of the sensor chip. As described above, in Japanese Laid-Open Patent Publication No. 2006-310658, it is difficult to ensure margins in terms of circuit design and manufacturing according to the output characteristics of the sensor unit.

In Japanese Laid-Open Patent Publication No. 2006-162421, both the power source wiring and the ground wiring are separated for internal power source voltage and for a measure against noise so as to prevent voltage variations in the wirings, and the non-linearity error in output characteristics of the operational amplifier is reduced as compared to Japanese Laid-Open Patent Publication No. 2006-310658. However, no consideration is given to the non-linearity of the output characteristics of the sensor unit. Therefore, although no problem occurs if the non-linearity of the output characteristics of the sensor unit is extremely small or if the output characteristics of the sensor unit and the output characteristics of the operational amplifier exhibit the non-linearity having the convex-shaped curves in the directions canceling each other's non-linearity, the same problem as Japanese Laid-Open Patent Publication No. 2006-310658 occurs if the output characteristics of the sensor unit and the output characteristics of the operational amplifier exhibit non-linearity having convex-shaped curves in directions augmenting each other's non-linearity.

In Japanese Laid-Open Patent Publication No. 2003-139638, the negative feedback of the output voltage of the sensor chip to the internal power source voltage of the sensor unit may lead to the supply of the internal power source voltage that includes noise to the sensor unit, resulting in a problem of susceptibility to noise. Additionally, since a large number of circuits are arranged for automatic correction of the non-linearity of the output characteristics of the sensor chip, increased circuit scale is also a problem. Moreover, since the number of the internal circuits becomes large, distribution of the power source voltage to the internal circuits other than the sensor unit reduces the power source voltage supplied to the sensor unit and decreases the sensor sensitivity. If an amplification factor of output voltage of the sensor unit is increased to increase the sensor sensitivity, output error may occur, which leads to a problem of difficulty in design.

The semiconductor physical quantity sensor device according to the present invention can deliberately generate the non-linearity of the output characteristics of the amplifier circuit to have a predetermined non-linearity error in a semiconductor physical quantity sensor device having a push-pull output type amplification/attenuation circuit and a CR filter connected to one or both of power source wiring and ground wiring. Therefore, the apparatus achieves effects in that the non-linearity error of the output characteristics of the sensor element can be reduced by the non-linearity error of the output characteristics of the amplifier circuit, and the non-linearity of the output characteristics of the sensor chip can be reduced.

As described above, the semiconductor physical quantity sensor device according to the present invention is useful for a semiconductor physical quantity sensor device including a push-pull output type amplification/attenuation circuit and having a CR filter connected to one or both of a power source wiring and a ground wiring.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor physical quantity sensor device, comprising:
    a sensor configured to sense a physical quantity to thereby generate an electrical signal, the sensor having a low potential side and a high potential side;
    a push-pull amplifier circuit configured to amplify the electrical signal generated by the sensor;
    a power source terminal for supplying a power source potential thereby;
    a ground terminal for supplying a ground potential thereby;
    an output terminal configured to output the electrical signal amplified by the amplifier circuit;
    a first power source wiring electrically connecting the power source terminal to the sensor;
    a second power source wiring electrically connecting the power source terminal to the amplifier circuit;
    a ground wiring electrically connecting the ground terminal to the low potential side of the sensor, and to the amplifier circuit;
    an electromagnetic-noise filter circuit electrically connected to the first power source wiring;
    a first resistor serially electrically connected to the second power source wiring; and
    a second resistor electrically connected between the output terminal and the ground terminal.

2. The semiconductor physical quantity sensor device according to claim 1, further comprising
    a first ground wiring electrically connecting the ground terminal to the sensor;
    a second ground wiring electrically connecting the ground terminal to the amplifier circuit;
    a third resistor serially electrically connected to the second ground wiring; and
    a fourth resistor electrically connected between the power source terminal and the output terminal.

3. The semiconductor physical quantity sensor device according to claim 2, wherein
the first resistor includes a plurality of first resistor elements connected in series,
the third resistor includes a plurality of second resistor elements connected in series, and
the semiconductor physical quantity sensor device further comprises:
a plurality of first switches connected to the plurality of the first resistor elements, each first switch being connected to both ends of and in parallel with a corresponding one of the first resistor elements;
a plurality of second switches connected to the plurality of the second resistor elements, each second switch being connected to both ends of and in parallel with a corresponding one of the second resistor elements; and
a control circuit controlling ON/OFF of the first switches and the second switches.

4. The semiconductor physical quantity sensor device according to claim 2, further comprising a fifth resistor connected between the power source terminal and the ground terminal.

5. The semiconductor physical quantity sensor device according to claim 2, further comprising a sensor chip that has a front surface and a back surface, wherein
the sensor is disposed on the back surface of the sensor chip, and
a pressure is applied as the physical quantity to the sensor chip from a side of the back surface.

6. The semiconductor physical quantity sensor device according to claim 1, wherein the first resistor has a resistance value set such that output characteristics of the electrical signal amplified by the amplifier circuit cancel non-linearity of output characteristics of the electrical signal generated by the sensor.

7. The semiconductor physical quantity sensor device according to claim 6, wherein the first resistor has the resistance value set such that a first equation expressing the output characteristics of the electrical signal generated by the sensor and a second equation expressing the output characteristics of the electrical signal amplified by the amplifier circuit are linearly symmetric with respect to an axis defined by a linear equation expressing output characteristics without non-linearity of the electrical signal output from the output terminal.

8. The semiconductor physical quantity sensor device according to claim 1, further comprising a sensor chip that has a front surface and a back surface, wherein
the sensor is disposed on the front surface of the sensor chip, and
a pressure is applied as the physical quantity to the sensor chip, from a side of the front surface.

9. A semiconductor physical quantity sensor device, comprising:
a sensor configured to sense a physical quantity to thereby generate an electrical signal, the sensor having a low potential side and a high potential side;
a push-pull amplifier circuit configured to amplify the electrical signal generated by the sensor;
a power source terminal for supplying a power source potential thereby;
a ground terminal for supplying a ground potential thereby;
an output terminal configured to output the electrical signal amplified by the push-pull amplifier circuit;
a first ground wiring electrically connecting the ground terminal to the sensor;
a second ground wiring electrically connecting the ground terminal to a low potential side of the push-pull amplifier circuit;
a power source wiring electrically connecting the power source terminal to the high potential side of the sensor and to the amplifier circuit;
an electromagnetic-noise filter circuit electrically connected to the power source wiring;
a first resistor serially electrically connected to the second ground wiring; and
a second resistor electrically connected between the power source terminal and the output terminal.

10. The semiconductor physical quantity sensor device according to claim 9, wherein the first resistor has a resistance value set such that output characteristics of the electrical signal amplified by the push-pull amplifier circuit cancel non-linearity of output characteristics of the electrical signal generated by the sensor.

11. The semiconductor physical quantity sensor device according to claim 10, wherein the first resistor has the resistance value set such that a first equation expressing the output characteristics of the electrical signal generated by the sensor and a second equation expressing the output characteristics of the electrical signal amplified by the amplifier circuit are linearly symmetric with respect to an axis defined by a linear equation expressing output characteristics without non-linearity of the electrical signal output from the output terminal.

12. The semiconductor physical quantity sensor device according to claim 9, further comprising a sensor chip that has a front surface and a back surface, wherein
the sensor is disposed on the back surface of the sensor chip, and
a pressure is applied as the physical quantity to the sensor chip from a side of the back surface.

13. A semiconductor physical quantity sensor device having a power source terminal for receiving a power source potential, a ground terminal for receiving a ground potential, and an output terminal, comprising:
a sensor configured to generate a signal;
an amplifier configured to amplify the signal, and to output the amplified signal through the output terminal;
a first resistor electrically connected between the power source terminal and a high potential side of the amplifier;
a second resistor electrically connected between the output terminal and the ground terminal; and
a filter electrically connected between the power source terminal and the sensor, and comprising a third resistor and a capacitor, the third resistor being different from the first resistor.

14. A semiconductor physical quantity sensor device having a power source terminal for receiving a power source potential, a ground terminal for receiving a ground potential, and an output terminal, comprising:
a sensor configured to generate a signal;
an amplifier configured to amplify the signal, and to output the amplified signal through the output terminal;
a first resistor electrically connected between the ground terminal and a low potential side of the amplifier;
a second resistor electrically connected between the output terminal and the power source terminal; and
a filter electrically connected between the power source terminal and the amplifier, and including a third resistor and a capacitor.

* * * * *